US011934528B2

United States Patent
Mueller et al.

(10) Patent No.: US 11,934,528 B2
(45) Date of Patent: Mar. 19, 2024

(54) SYSTEM AND METHOD FOR PROVIDING TRANSITIVE BOOTSTRAPPING OF AN EMBEDDED SUBSCRIBER IDENTIFICATION MODULE

(71) Applicant: Dell Products, LP, Round Rock, TX (US)

(72) Inventors: Julius Mueller, Santa Cruz, CA (US); Liam B. Quinn, Austin, TX (US); Suresh K. Ramasamy, Cedar Park, TX (US); Abeye Teshome, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 335 days.

(21) Appl. No.: 17/502,464

(22) Filed: Oct. 15, 2021

(65) Prior Publication Data
US 2023/0117867 A1    Apr. 20, 2023

(51) Int. Cl.
*G06F 21/57*        (2013.01)
*G06F 21/44*        (2013.01)

(52) U.S. Cl.
CPC ............ *G06F 21/575* (2013.01); *G06F 21/44* (2013.01); *G06F 21/572* (2013.01)

(58) Field of Classification Search
CPC ...... G06F 21/575; G06F 21/44; G06F 21/572; H04W 12/04; H04W 8/265; H04W 4/50; H04L 2209/80
See application file for complete search history.

(56) References Cited

U.S. PATENT DOCUMENTS

| | | | | |
|---|---|---|---|---|
| 2010/0080202 | A1* | 4/2010 | Hanson | H04W 12/084 370/338 |
| 2014/0082721 | A1* | 3/2014 | Hershman | G06F 21/44 726/16 |
| 2016/0085561 | A1* | 3/2016 | Starsinic | G06F 9/4416 713/2 |
| 2022/0052999 | A1* | 2/2022 | Pak | H04L 63/0884 |
| 2022/0109980 | A1* | 4/2022 | Saarnivala | H04W 8/245 |

* cited by examiner

*Primary Examiner* — Ali S Abyaneh
(74) *Attorney, Agent, or Firm* — Prol Intellectual Property Law, PLLC; H. Kenneth Prol

(57) ABSTRACT

A system and method for establishing a bootstrap bridge via a network interface device at an information handling system to provide a transitive bootstrapping process for an untrusted (new) information handling system, wherein the bootstrap bridge comprises a temporary network enabler for communicating with the untrusted (new) information handling system and a secure gateway for communicating with a trusted core network, and wherein the bootstrap bridge receives an authentication request from the untrusted (new) information handling system via the temporary network enabler, wherein the authentication request includes an untrusted (new) information handling system identification (ID) with temporary authentication data loaded to the untrusted (new) information handling system upon manufacture, and the network interface device to transmit a request for challenge for the untrusted (new) information handling system ID to the trusted core network via the secure gateway on behalf of the untrusted (new) information handling system.

20 Claims, 11 Drawing Sheets

SYSTEM AND METHOD FOR PROVIDING TRANSITIVE BOOTSTRAPPING OF AN EMBEDDED SUBSCRIBER IDENTIFICATION MODULE

FIELD OF THE DISCLOSURE

The present disclosure generally relates to remotely bootstrapping an embedded subscriber identification module (eSIM) of an information handling system. More particularly, the present disclosure relates to bootstrapping an eSIM of an untrusted (new) information handling system via a trusted and authenticated information handling system.

BACKGROUND

As the value and use of information continues to increase, individuals and businesses seek additional ways to process and store information. One option available to clients is information handling systems. An information handling system generally processes, compiles, stores, and/or communicates information or data securely for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. As new information handling systems are purchased by clients, these new information handling systems may be added to the clients' networks via remote bootstrapping processes.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
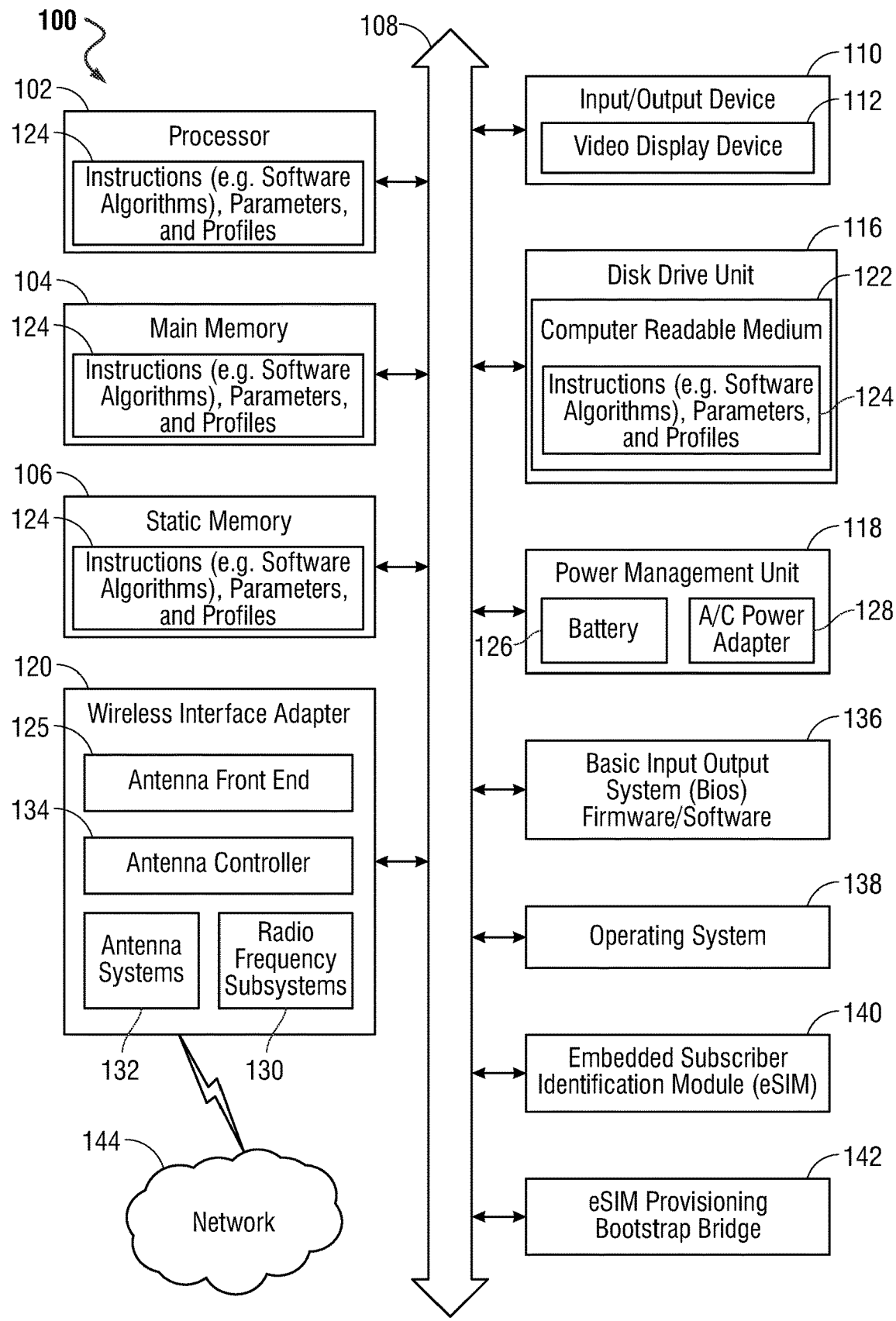
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

A subscriber identity module or subscriber identification module (SIM), i.e., a SIM card, is an integrated circuit running a card operating system (COS) that may be used to securely store an international mobile subscriber identity (IMSI) number and a related key. The information stored on the SIM card may be used to identify and authenticate the subscribers on mobile telephony information handling systems, e.g., mobile phones and computers. It is also possible to store contact information on many SIM cards. A SIM circuit is part of the function of a universal integrated circuit card (UICC) physical smart card, which is usually made of PVC with embedded contacts and semiconductors. In an embodiment, multiple profiles may be stored on a single embedded UICC (eUICC). Traditional SIM cards may be removable from their respective information handling systems and accordingly, they may be transferable between different mobile information handling systems. Typically, a SIM card may include an integrated circuit card identification number (ICCID), international mobile subscriber identity (IMSI) number, security authentication and ciphering information, temporary information related to the local network, a list of the services the user has access to, and two passwords: a personal identification number (PIN) for ordinary use, and a personal unblocking key (PUK) for PIN unlocking.

In recent years, the Global System for Mobile Communications Association (GSMA) defined a new way to embed the SIM card in information handling systems. The SIM may be downloaded into a secure element that may be permanently embedded inside any type of information handling system. To enable this migration to the embedded SIM (eSIM), the GSMA facilitated an ecosystem of trusted platforms and players in order to create and support the eSIM solution. The eSIM may offer an equivalent level of security and protection to that provided by the removable SIM card. As such, the subscription credentials typically stored on the eSIM that enable secure and private access to mobile networks remain in a very secure environment.

When a new information handling system is powered on for the very first time, it must undergo a bootstrapping process in which the information handling system may connect to a remote SIM Provisioning system and securely download a SIM Profile associated with consumer, or end user. Once the SIM Profile is installed and activated, the information handling system may be able to connect to a particular operator's network. The eSIM bootstrapping process as prescribed by the GSMA Consumer Solution may be cumbersome due to the initial connectivity that a user may need to enable on the information handling system before the provisioning bootstrap process may commence. For example, the user may be required to manually pair the new information handling system with either an existing information handling system over a Bluetooth connection or a Wi-Fi access point by entering specific credentials. For information handling systems without screens, information handling systems with relatively small screens, information handling systems without keyboards, information handling systems with relatively small keyboards, information handling systems with limited keyboards, or information handling systems having any of these limitations, the process of manually pairing a new information handling system with an existing information handling system may be challenging. In turn, the initial bootstrapping process may be difficult for some users. For corporate consumers who purchase large numbers of information handling systems any streamlining of the bootstrapping process may result in significant cost savings.

The systems and methods disclosed herein may significantly streamline the bootstrapping process by enabling a bootstrap bridge within a trusted and authenticated information handling system to provide transitive bootstrapping in which the trusted and authenticated information handling system may initiate the bootstrapping process for an untrusted (new) information handling system and may communicate with a trusted core network on behalf of the untrusted (new) information handling system. The trusted and authenticated information handling system may act as a bridge for the untrusted (new) information handling system for the bootstrapping process until a profile for the untrusted (new) information handling system is retrieved from the trusted core network and the untrusted (new) information handling system updates the profile at the untrusted (new) information handling system to become a trusted new information handling system. After the trusted new information handling system is updated with the SIM profile from the trusted core network, the trusted new information handling system may communicate directly with the trusted core network by transmitting an authentication request directly to the trusted core network.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic information handling system, a network server or storage device, a network router, switch, or bridge, wireless router, or other network communication information handling system, a network connected device (cellular telephone, tablet information handling system, etc.), IoT computing device, wearable computing device, a set-top box (STB), a mobile device, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic information handling systems that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of an antenna selection algorithm , and drive unit 116 (volatile (e.g., random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display device 110. The video display device 110 in an embodiment may function as a liquid crystal display (LCD), an organic light emitting diode (OLED), a flat panel display, or a solid-state display. Additionally, the information handling system 100 may include an alpha numeric input device 112, such as a keyboard, and/or a cursor control device, such as a mouse, touchpad, or gesture or touch screen input device. The information handling system 100 can also include a disk drive unit 116.

The network interface device shown as wireless interface adapter 120 can provide connectivity to a network 144, e.g., a wide area network (WAN), a local area network (LAN), wireless local area network (WLAN), a wireless personal area network (WPAN), a wireless wide area network (WWAN), or another network. In an embodiment, the WAN, WWAN, LAN, and WLAN may each include an access point used to operatively coupled the information handling system 100 to a network. In a specific embodiment, the network 144 may include macro-cellular or private wireless connections via one or more base stations 162 or a wireless access points 160 (e.g., Wi-Fi or WiGig), or such as through licensed or unlicensed WWAN small cell base stations.

Connectivity may be via wired or wireless connection. Wireless interface adapter 120 may include one or more radio frequency subsystems 130 with transmitter/receiver circuitry, modem circuitry, one or more radio frequency front end circuits, one or more wireless controller circuits, amplifiers, antenna systems 132 and other circuitry of the radio frequency subsystem 130 such as one or more antenna ports used for wireless communications via multiple radio access technologies. Each radio frequency subsystem 130 may communicate with one or more wireless technology protocols. The radiofrequency subsystem 130 may contain individual subscriber identity module (SIM) profiles for each technology service provider and their available protocols for any operating subscriber-based radio access technologies such as cellular LTE communications.

The wireless interface adapter 120, also known as a wireless interface device, may also include antenna systems 132 which may include any number of tunable antenna systems for use with the system and methods disclosed herein. Additional antenna system modification circuitry (not shown) may also be included with the wireless interface adapter 120 to implement coexistence control measures via an antenna controller 134 as described in various embodiments of the present disclosure.

In some aspects of the present disclosure, the wireless interface adapter 120 may operate two or more wireless links. In a further aspect, the wireless interface adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas or antennas may be capable of operating at a variety of frequency bands.

The wireless interface adapter 120 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, or similar wireless standards may be used. Wireless interface adapter 120 may connect to any combination of macro-cellular wireless connections including 2G, 2.5G, 3G, 4G, 5G , 6G, or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 144 may be based on the radio access network (RAN) standards that implement, for example, eNodeB or gNodeB hardware connected to mobile phone networks (e.g., cellular networks) used to communicate with the information handling system 100. In the example embodiment, mobile device 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end of the information handling system 100 may operate on a licensed WWAN wireless radio with authorization for subscriber access to a wireless service provider on a carrier licensed frequency band.

The wireless interface adapter 120 can represent an add-in card, wireless network interface module that is integrated with a main board of the information handling system or integrated with another wireless network interface capability, or any combination thereof. In an embodiment the wireless interface adapter 120 may include one or more radio frequency subsystems 130 including transmitters and wireless controllers for connecting via a multitude of wireless links. In an example embodiment, an information handling system may have an antenna system transmitter for 5G small cell WWAN, Wi-Fi WLAN or WiGig connectivity and one or more additional antenna system transmitters for macro-cellular communication. The radio frequency subsystems 130 include wireless controllers to manage authentication, connectivity, communications, power levels for transmission, buffering, error correction, baseband processing, and other functions of the wireless interface adapter 120.

The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device or other input/output devices 112, and other components that may require power when a power button has been actuated by a user. In an embodiment, the PMU 118 may monitor power levels and be electrically coupled to the information handling system 100 to provide this power and coupled to bus 108 to provide or receive data or instructions. The PMU 118 may regulate power from a power source such as a battery 126 or A/C power adapter 128. In an embodiment, the battery 126 may be charged via the A/C power adapter 128 and provide power to the components of the information handling system 100 when A/C power from the A/C power adapter 128 is removed.

Information handling system 100 includes one or more of an operating system (OS) 138, and basic input/output system (BIOS) firmware/software 136 or application programs that may be executable instructions 124 executed at any processor 102 and stored at one or more memory devices 104, 106, or 116. BIOS firmware/software 136 functions to initialize information handling system 100 on power up, to launch an OS 138, and to manage input and output interactions between the OS 138 and the other elements of information handling system 100. In a particular embodiment, BIOS firmware/software 136 resides in memory 104, and include machine-executable code that is executed by processor 102 to perform various functions of information handling system 100 as described herein. In another embodiment (not illustrated), application programs and BIOS firmware/software 136 reside in another storage medium of information handling system 100. For example, application programs and BIOS firmware/software 136 can reside in drive 116, in a ROM (not illustrated) associated with information handling system 100, in an option-ROM (not illustrated) associated with various devices of information handling system 100, in a storage system (not illustrated) associated with network channel of a wireless interface adapter 120, in another storage medium of information handling system 100, or a combination thereof. Executable code instructions 124 for application programs and BIOS firmware/software 136 can each be implemented as single programs, or as separate programs carrying out the various features as described herein.

As shown in FIG. 1, the information handling system 100 may further include an embedded subscriber identification module (eSIM) 140. The eSIM 140 may include an integrated circuit card identification number (ICCID) for the information handling system 100, an international mobile subscriber identity (IMSI) number for the information handling system 100, security authentication and ciphering information for the information handling system 100, temporary information related to a local network associated with the information handling system 100, a list of the services that the information handling system 100 has access to, and two passwords: a personal identification number (PIN) for ordinary use, and a personal unblocking key (PUK) for PIN unlocking. As shown, the information handling system 100 may also include an eSIM provisioning bootstrap bridge 142. The eSIM provisioning bootstrap bridge 142 is described in greater detail below and can provide transitive bootstrapping services to an untrusted and authenticated information handling system (not shown in FIG. 1) after the information handling system 100 is authenticated and deemed trusted.

In an embodiment, the information handling system 100 may connect to an external wireless network 144. In particular, the wireless network 144 may have a wireless mesh architecture in accordance with mesh networks described by the wireless data communications standards or similar standards in some embodiments but not necessarily in all embodiments. The wireless interface adapter 120 may connect to the external wireless network 144 via a WPAN, WLAN, WWAN or similar wireless switched Ethernet connection in some embodiments. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware information handling systems can be constructed to implement one or more of the methods described herein. Applications that may include the apparatus and systems of various embodiments can broadly include a variety of electronic and computer systems. One or more embodiments described herein may implement functions using two or more specific interconnected hardware modules or information handling systems with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the wireless network 144. Further, the instructions 124 may be transmitted or received over the wireless network 144 via the network interface device, i.e., the wireless interface adapter 120.

The wireless interface adapter 120 represents a network interface card (NIC) disposed within information handling system 100, on a main circuit board of the information handling system, integrated onto another component such as processor 102, in another suitable location, or a combination thereof. The wireless interface adapter 120 can include another information handling system, a data storage system, another network, a grid management system, another suitable resource, or a combination thereof. In an embodiment, the wireless interface adapter 120 may operably connect to the network 144. The connection to network 144 may be wired or wireless.

The network interface device shown as wireless interface adapter 120 can provide connectivity to the network 144, such as a wide area network (WAN), a local area network (LAN), wireless local area network (WLAN), a wireless personal area network (WPAN), a wireless wide area network (WWAN), a radio frequency identification (RFID) network, or another network. Connectivity may be via wired or wireless connection. The wireless interface adapter 120 may include an adaptive massive MIMO Multiplexer with transmitter/receiver circuitry, wireless controller circuitry, amplifiers and other circuitry for wireless communications. The wireless interface adapter 120 may also include antenna systems 132 as described above which may be tunable antenna systems for use with the system and methods disclosed in the embodiments herein. The antenna controller 134 may also include wireless controllers to manage authentication, connectivity, communications, power levels for transmission, buffering, error correction, baseband processing, and other functions of the wireless interface adapter 120.

The information handling system 100 can include a set of instructions 124 that can be executed to cause the computer system to perform any one or more of the methods or computer-based functions disclosed herein. For example, instructions 124 may execute an antenna selection algorithm, various software applications, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and may include a computer-readable medium 122 in which one or more sets of instructions 124 such as software can be embedded to be executed by the processor 102 and antenna controller 134 to perform the processes described herein. Similarly, main memory 104 and static memory 106 may also contain a computer-readable medium for storage of one or more sets of instructions, parameters, or profiles 124 including one or more look-up tables and/or one or more antenna selection algorithms 164. The disk drive unit 116 or static memory 106 also contain space for data storage. Further, the instructions 124 may embody one or more of the methods or logic as described herein. In a particular embodiment, the instructions, parameters, and profiles 124 may reside completely, or at least partially, within the main memory 104, the static memory 106, and/or within the disk drive 116 during execution by the processor 102 or an antenna controller 134 of information handling system 100. The main memory 104 and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The antenna selection algorithm 164 and sideband serial messaging protocol 142 and the drive unit 116 may include access to a computer-readable medium 122 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such devices, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
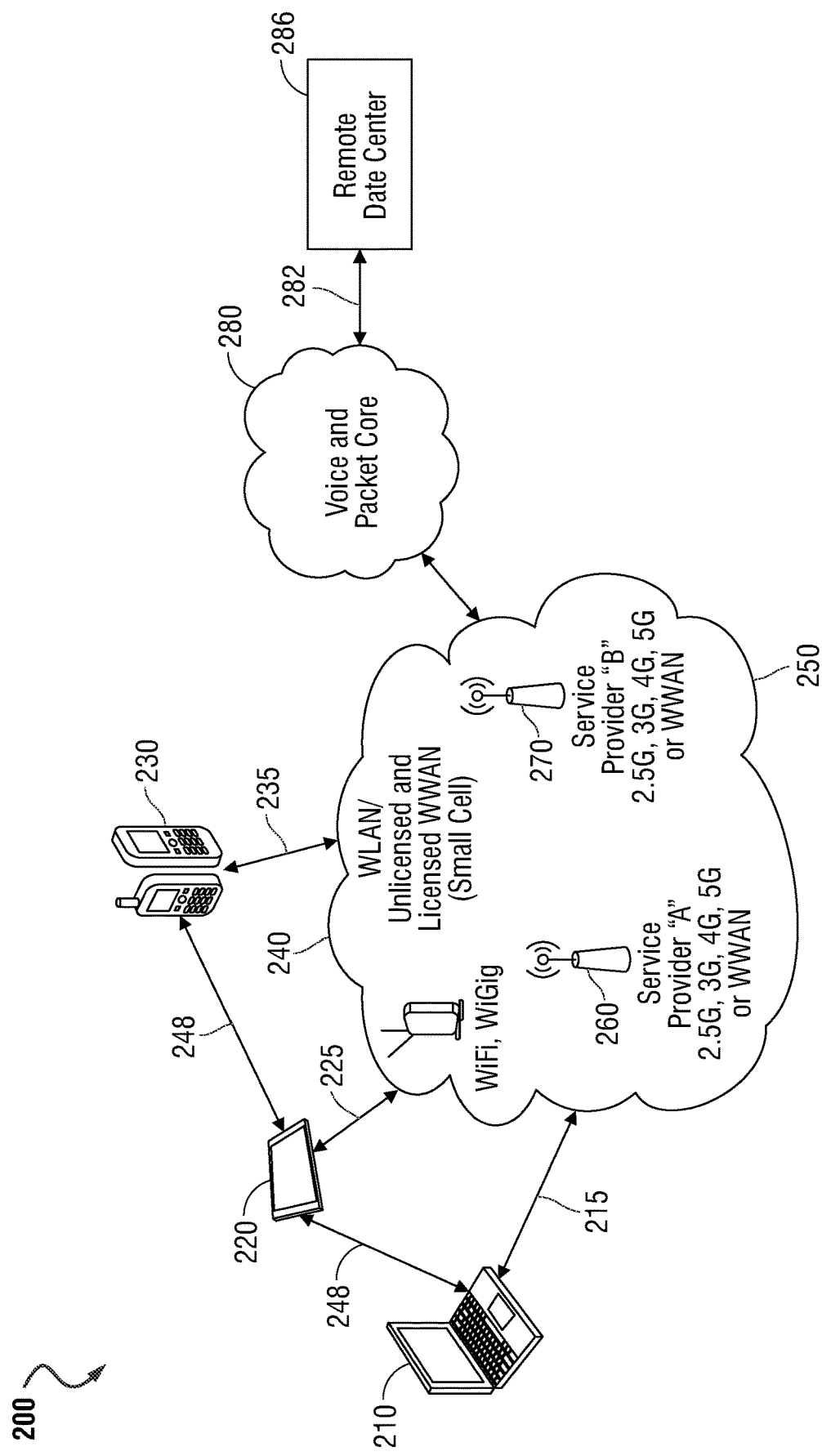
FIG. 2 is a block diagram of a network environment offering several communication protocol options and mobile information handling systems according to an embodiment of the present disclosure.

FIG. 2 illustrates a network 200 that can include one or more information handling systems 210, 220, 230. The information handling systems 210, 220, 230 shown in FIG. 2 may be similar to the information handling system 100 described in connection with FIG. 1. In a particular embodiment, network 200 includes networked mobile devices 210, 220, and 230, wireless network access points, and multiple wireless connection link options. A variety of additional computing resources of network 200 may include client mobile devices, data processing servers, network storage devices, local and wide area networks, or other resources as needed or desired. As partially depicted, information handling systems 210, 220, 230 may be a laptop computer, tablet computer, 360-degree convertible systems, wearable computing devices, or a smart phone device. These mobile devices 210, 220, and 230, may access a wireless local network 240, or they may access a macro-cellular network 250. For example, the wireless local network 240 may be available through an access point 245 and may operate a wireless local area network (WLAN), a wireless personal area network (WPAN), or a wireless wide area network (WWAN). The access point 245 may be a WLAN access point for Wi-Fi communications in an embodiment. In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points 245 or base stations 260, 270 may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or emerging 5G small cell WWAN communications such as gNodeB, eNodeB, or similar wireless network protocols and access points. Alternatively, other available wireless links within network 200 may include macro-cellular connections 250 via one or more service provider base stations 260 and 270. As described herein, a plurality of antennas may be operatively coupled to any of the macro-cellular connections 250 via one or more service providers or to the wireless local area networks (WLANs) selectively based on the SAR data, RSSI data, configuration data, system operation and connection metrics, and antenna mounting locations (e.g., spatial locations within the information handling system) associated with each information handling systems 210, 220, 230 as described herein. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. Each of these frequencies used to communicate over the network 144 may be based on the radio access network (RAN) standards that implement, for example, eNodeB or gNodeB hardware connected to mobile phone networks (e.g., cellular networks) used to communicate with the information handling system 100. In the example embodiment, mobile device 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the information handling system 100 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments according to the present disclosure, a networked mobile device 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or the plurality of antennas in each information handling system 210, 220, 230 may be used on each of the wireless communication devices such as according to embodiments herein and may be suited to plural RF bands. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create situations where a plurality of antenna systems are operating on a mobile device 210, 220 or 230 via concurrent communication wireless links on both WLAN and WWAN radios and antenna systems. In some embodiments, concurrent wireless links may operate within the same, adjacent, or otherwise interfering communication frequency bands and may be required to utilize spaced antennas. The antenna may be a transmitting antenna that includes high-band, medium-band, low-band, and unlicensed band transmitting antennas in embodiments herein.

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile devices such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile device or may connect directly to one or more mobile devices 210, 220, and 230. Alternatively, mobile devices 210, 220, and 230 may connect to the external network via base station locations at service providers such as 260 and 270. These service provider locations may be network connected via backhaul connectivity through the voice and packet core network 280. In an embodiment of the present disclosure, connection 282 may be considered optional for private wireless deployment in which the core network is located on premises. In such a case, no connectivity to a remote data center 286 is provided and the authentication may occur locally on premises.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile devices 210, 220, and 230 allowing streamlining and efficiency within those devices. Similarly, remote data center permits fewer resources to be maintained in other parts of network 200.

In a particular aspect, the remote data center 286 may include an authentication server. The authentication server may authenticate information handling systems, e.g., a trusted and authenticated information handling system, based on local credentials that may be stored at the trusted and authenticated information handling system and transmitted to the remote data center 286. The remote data center 286 may also include a SIM profile provisioning server. The SIM profile provisioning server may be used to distribute SIM profiles, e.g., eSIMS, to new information handling systems as these new information handling system are brought online for the first time.

Although 215, 225, and 235 are shown connecting wireless adapters of mobile devices 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile devices 210, 220, and 230 may communicate intra-device via 248 when one or more of the mobile devices 210, 220, and 230 are set to act as an access point or even potentially an WWAN connection via small cell communication on licensed or unlicensed WWAN connections. For example, one of mobile devices 210, 220, and 230 may serve as a Wi-Fi hotspot in an embodiment. Concurrent wireless links to information handling systems 210, 220, and 230 may be connected via any access points including other mobile devices as illustrated in FIG. 2.

Figure 3:
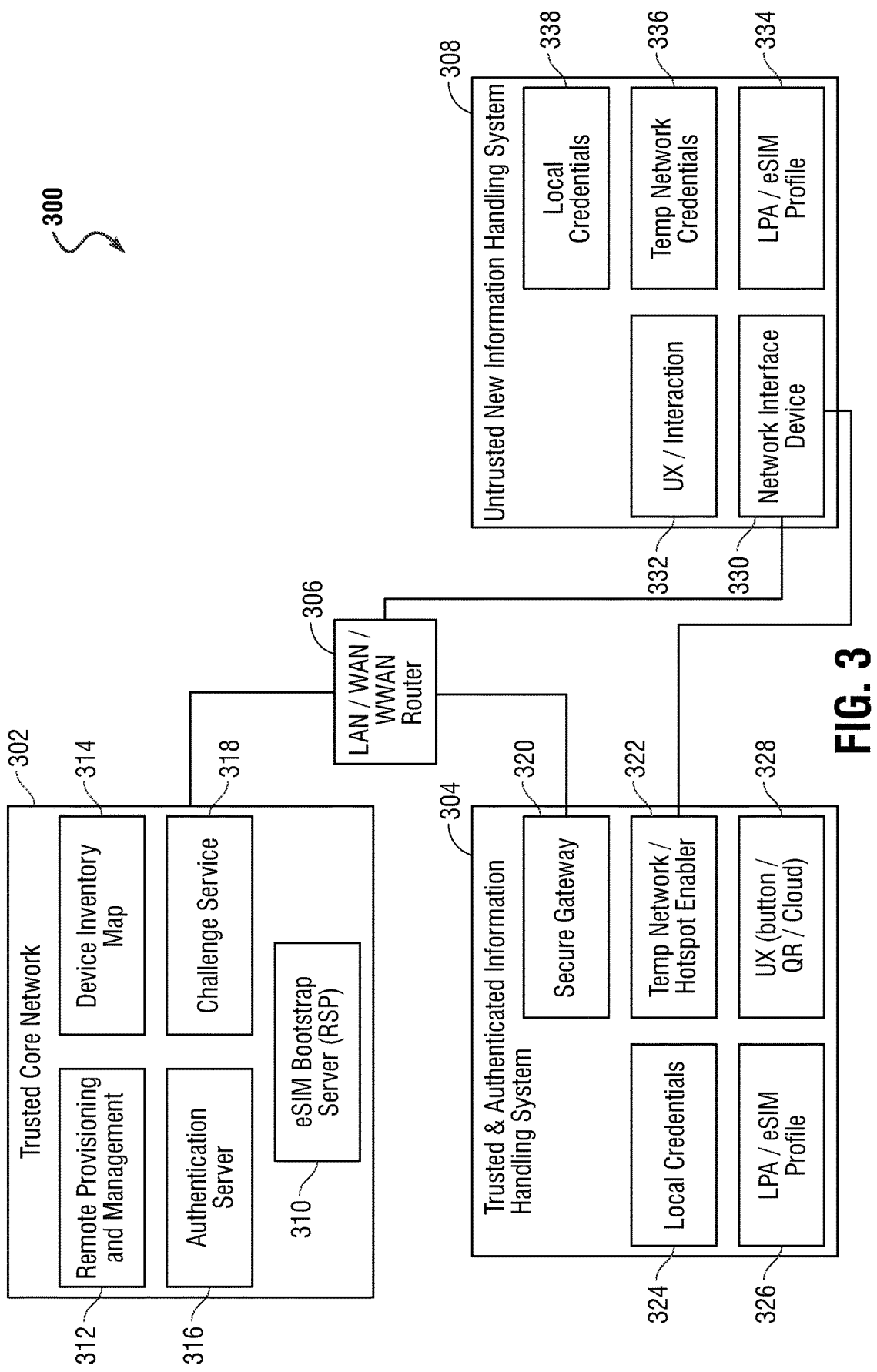
FIG. 3 is a block diagram of a remote, transitive bootstrapping system according to an embodiment of the present disclosure.

Referring now to FIG. 3, a remote, transitive bootstrapping system is illustrated and is generally designated 300. As shown, the remote, transitive bootstrapping system 300 may include a trusted core network 302. The trusted core network 302 may be similar to the information handling system 100 described in connection with FIG. 1. In particular, the trusted core network 302 may be one or more backend information handling system servers to administer a plurality of management services for deployed information handling systems of an enterprise. The trusted core network 302 may be in wireless communication with a trusted and authenticated information handling system 304 via an out-of-band wireless link such as established via Wi-Fi or another protocol. In another aspect, the trusted core network 302 may also establish in-band wireless communication with the trusted and authentication information handling system 304. It is to be understood that the out-of-band wireless communication may be conducted by an embedded controller within the trusted and authenticated information handling system 304 beneath, or behind, the operating system of the trusted and authenticated information handling system 304. Accordingly, the out-of-band wireless communication may occur without the knowledge of the operating system or require any permissions from the operating system to occur.

The trusted core network 302 may act as a backend to a network system, as a datacenter, or a combination thereof. Further, as described in greater detail below, the trusted core network 302 may include a plurality of backend bootstrap and provisioning functions. FIG. 3 shows that a trusted and authenticated information handling system 304 may be connected to, and may communicate with, the trusted core network 302 via a network router 306. The trusted and authenticated information handling system 304 may be similar to the information handling system 100 described in connection with FIG. 1. The network router 306 may be a LAN router, WAN router, WWAN router such as at a base station, WLAN router such as an access point, or another network router.

The trusted and authenticated information handling system 304 may be an information handling system that has previously been bootstrapped and provisioned to a particular provider and a particular network. The trusted and authenticated information handling system 304 may also have credentials that allow it to be authenticated to the trusted core network 304. As described in greater detail below, the trusted and authenticated information handling system 304 may act as a bootstrap bridge in order to provide transitive bootstrapping of another information handling system. For example, the trusted and authenticated information handling system 304 may provide transitive bootstrapping for an untrusted (new) information handling system 308 that may be initially connected to, and communicate with, the trusted core network 302 via the trusted and authenticated information handling system 304. Once the untrusted (new) information handling system 308 is bootstrapped, as described below, the untrusted (new) information handling system 308 may communicate directly with the trusted core network 302 via the network router 306. The untrusted (new) information handling system 308 may be similar to the information handling system 100 described in connection with FIG. 1.

FIG. 3 indicates that the trusted core network 302 may include an eSIM Bootstrap Server 310 that may be a remote SIM/eSIM provisioning platform (RSP). The eSIM Bootstrap Server 310 may be configured to receive bootstrap requests from one or more new information handling systems, e.g., the untrusted (new) information handling system 308, via the trusted and authenticated information handling system 304. The trusted core network 302 may include a provisioning and management module 312 that may provide provisioning and management services to one or more new information handling systems, e.g., the untrusted (new) information handling system 308, via the trusted and authenticated information handling system 304. The provisioning and management services may include retrieving information handling system profiles and transmitting them to the one or more user information handling systems requesting bootstrapping via the trusted and authenticated information handling system 304.

As shown, the trusted core network 302 may include a device inventory map 314. The device inventory map 314 may include information regarding which information handling systems have been provisioned, which information handling systems require provisioning, etc. The trusted core network 302 may further include an authentication server 316. The authentication server 316 can authenticate information handling systems, e.g., the trusted and authenticated information handling system 304, based on local credentials that may be stored at the trusted and authenticated information handling system 304 and transmitted to the trusted core network 302. The trusted core network 304 may also include a challenge service module 318 during the remote provisioning of an eSIM at a new information handling system, e.g., the untrusted (new) information handling system 308. During the remote bootstrapping of the eSIM at the untrusted (new) information handling system 308, the challenge service module 318 can issue a challenge to the untrusted (new) information handling system 308. For example, the challenge may be solved using the key associated with the IMSI number stored within the eSIM.

FIG. 3 further indicates that the trusted and authenticated information handling system 304 may include a secure gateway 320. The secure gateway 320 may be a network interface device with a controller to limit bootstrap access to the network router 306 in an exemplary embodiment. The secure gateway 320 may allow the trusted and authenticated information handling system 304 to connect the trusted core network 302 via the network router 306. The secure gateway 320 may be configured to prevent the trusted and authenticated information handling system 304, or the user thereof, from accessing malicious website traffic on the internet and in the cloud that could infect the trusted and authenticated information handling system 304 and compromise the internal network to which the trusted and authenticated information handling system 304 is connected. The secure gateway 320 may also ensure that the trusted and authenticated information handling system 304, or the user thereof, accesses the internet in compliance with the policies and regulations of the organization that owns the trusted and authenticated information handling system 304.

The trusted and authenticated information handling system 304 may include a temporary network enabler 322. The temporary network enabler 322 may also be considered a temporary hotspot enabler. The temporary network enabler 322 may act as a temporary network connection, or hotspot, for the untrusted (new) information handling system 308 to communicate with the trusted and authenticated information handling system 304 and the trusted core network 302 before the untrusted (new) information handling system 308 is bootstrapped and provisioned via the transitive bootstrapping process provided by the trusted and authenticated information handling system 304. The trusted and authenticated information handling system 304 may also include local credentials 324 that may be transmitted to the trusted core network 302 in order to identify and authenticate the trusted and authenticated information handling system 304 with the trusted core network 302 before the transitive bootstrapping process commences. As illustrated, the trusted and authenticated information handling system 304 may include a local profile assistant (LPA) 326. The LPA 326 may include an eSIM profile associated with the trusted and authenticated information handling system 304. The eSIM profile may include an integrated circuit card identification number (ICCID) for the trusted and authenticated information handling system 304, an international mobile subscriber identity (IMSI) number for the trusted and authenticated information handling system 304, security authentication and ciphering information for the trusted and authenticated information handling system 304, temporary information related to a local network associated with the trusted and authenticated information handling system 304, a list of the services that the trusted and authenticated information handling system 304 has access to, and two passwords: a personal identification number (PIN) for ordinary use, and a personal unblocking key (PUK) for PIN unlocking. The trusted and authenticated information handling system 304 may further include a user experience (UX) module 328. The UX module 328 may provide a graphical user interface (GUI) to a user. The GUI may include a touch button, a quick response (QR) code, access to a cloud, a web address, or some other indicator that the user of the untrusted (new) information handling system may utilize in order to initiate the transitive bootstrapping process.

Still referring to FIG. 3, the untrusted (new) information handling system 308 may include a network interface device 330. The network interface device 330 can provide connectivity to a network, e.g., a wide area network (WAN), a local area network (LAN), wireless local area network (WLAN), a wireless personal area network (WPAN), a wireless wide area network (WWAN), or other network, via the temporary network enabler 322 at the trusted and authenticated information handling system 304. As such, the network interface device 330 may allow the untrusted (new) information handling system 308 to connect the trusted core network 302 via the secure gateway 320 and network interface device 330 of the trusted and authenticated information handling system 304 with the network router 306. The untrusted (new) information handling system 308 may further include a user experience (UX) module 332. The UX module 332 may provide a graphical user interface (GUI) to a user to allow user interaction with the untrusted (new) information handling system 308. The UX module 332 may be configured to allow a user of the untrusted (new) information handling system 308 to initiate the transitive bootstrapping process via a single button press, a scan of a QR code, an entry of a web address, or another relatively simple initiator.

As depicted, the untrusted (new) information handling system 304 may include an LPA 334. The LPA 334 may include an eSIM profile associated with the untrusted (new) information handling system 308. The eSIM profile may include an ICCID for the untrusted (new) information handling system 308, an IMSI number for the untrusted (new) information handling system 308, security authentication and ciphering information for the untrusted (new) information handling system 308, temporary information related to a local network associated with the untrusted (new) information handling system 308, a list of the services that the untrusted (new) information handling system 308 has access to, and two passwords: a PIN for ordinary use, and a PUK for PIN unlocking.

The untrusted (new) information handling system 308 may include temporary network credentials 336. The temporary network credentials 336 may be factory installed and may be used to authenticate the untrusted (new) information handling system 308 with the trusted core network 302 through the bootstrap bridge provided by the trusted and authenticated information handling system 304 via its network interface device 330 and secure gateway 320. In particular, during the transitive bootstrapping process, shown in the flow charts and described in detail below, the eSIM bootstrap server 310 may receive the temporary network credentials 336 from the untrusted (new) information handling system 308 via the trusted and authenticated information handling system 304. The eSIM bootstrap server 310 may verify that the temporary credentials are authentic and in turn, the eSIM bootstrap server 310 may return a profile, e.g., an eSIM profile, to the untrusted (new) information handling system 308 via the trusted and authenticated information handling system 304, where it may be stored in an embedded UICC with the LPA 334 of the untrusted (new) information handling system 308.

The untrusted (new) information handling system 308 may also include local credentials 338 that may be updated once the untrusted (new) information handling system 308 is authenticated and subsequently deemed to be a trusted and authenticated information handling system 308. After the transitive bootstrapping process in which the untrusted (new) information handling system 308 is authenticated, the local credentials 338 may be transmitted to the trusted core network 302 in order to identify and authenticate the untrusted (new) information handling system 308 with the trusted core network 302 for subsequent post-bootstrapping communications with the trusted core network 302. During the initiation of the bootstrapping of the untrusted (new) information handling system 308 via the trusted and authenticated information handling system 304, the physical proximity between the trusted and authenticated information handling system 304 and the untrusted (new) information handling system 308 provides a measure of security in that it indicates the system that the untrusted (new) information handling system 308 is allowed to access the network while provisioning occurs. The local credentials 338 may verify the access locally and to the back end. The local credentials 338 may be derived from the hardware serial number, software serial numbers, and other manufacturer known information and may be loaded onto untrusted (new) information handling system 308 as well as provided to a backend management and operations (M&O) module.

Figure 4:
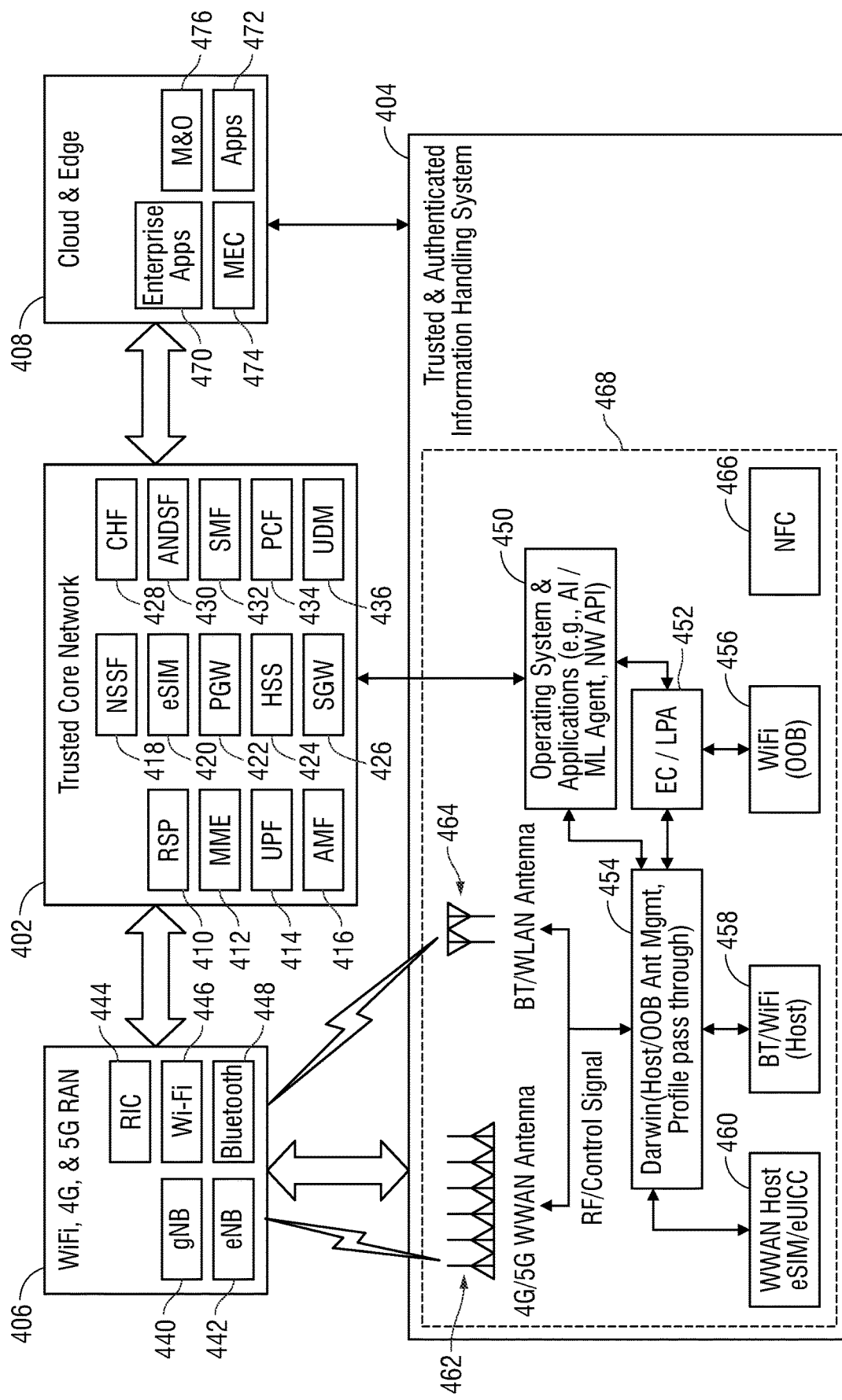
FIG. 4 is a block diagram of a remote, transitive bootstrapping system according to another embodiment of the present disclosure.

Referring now to FIG. 4, another embodiment of a remote, transitive bootstrapping system 400 is illustrated. The remote, transitive bootstrapping system 400 depicted in FIG. 3 may include some of the same components of the remote, transitive bootstrapping system 300 described in FIG. 3 and vice versa. As shown in FIG. 4, the remote, transitive bootstrapping system 400 may include a trusted core network 402. The trusted core network 402 may be comprised of a plurality of networked the information handling systems, such as shown in FIG. 1 with the addition of one or more features described in conjunction with FIG. 4. The trusted core network 402 may be in communication with a trusted and authenticated information handling system 404 via a radio access network (RAN) 406. The trusted and authenticated information handling system 404 may be the same as the trusted and authenticated information handling system 304 described in conjunction with FIG. 3 and may include one or more of the features and components of the trusted and authenticated information handling system 304 illustrated in FIG. 3 and vice versa. In a particular aspect, the RAN 406 may include a Wi-Fi RAN, a 4G RAN, a 5G RAN, Bluetooth, or a combination thereof. FIG. 4 also shows that the remote, transitive bootstrapping system 400 may further include a cloud and edge information handling system 408. The cloud and edge information handling system 408 may be the same as the information handling system 100 shown in FIG. 1 with the addition of the features described in conjunction with FIG. 4.

FIG. 4 shows that the trusted core network 402 may include a plurality of functions and modules that will allow it to operate and communicate over various network systems, such as 4G, 5G, 6G, etc., in various embodiments. For example, the trusted core network 402 may include a remote SIM provisioning (RSP) module 410 and the RSP module 410 may be used to remotely provision the eSIMs of new information handling systems as they are brought online for the first time. The trusted core network 402 may also include a mobility management entity (MME) 412. The MME 412 may provide mobility session management for a long term evolution (LTE) network and further, the MME 412 may support subscriber authentication, roaming, and handovers to other networks. As shown, the trusted core network 402 may also include a user plane function (UPF) 414. The UPF 414 is related to a 3GPP 5G architecture is similar to a Serving/Packet Gateway in a 4G LTE system. The UPF 414 may support features and capabilities to facilitate user plane operation. For example, the UPF 414 may provide packet routing and forwarding, interconnection to a data network, policy enforcement, and data buffering. As shown in FIG. 4, the trusted core network 402 may further include an access and mobility management function (AMF) 416. The AMF 416 may provide registration management, connection management, reachability management, mobility management, and various other functions that may relate to security management, access management, and authorization management.

FIG. 4 further shows that the trusted core network 402 may include a network slice selection function (NSSF) 418. The NSSF 418 may be used by the AMF 416 to assist with the selection of network slice instances that will serve a particular device, e.g., the trusted core network 402. Moreover, the NSSF 418 may determine which network slice selection assistance information (NSSAI) may be supplied to the device. In addition, the NSSF 418 may be used to allocate another AMF, when available, if the current AMF 416 does not have the capability to support all network slice instances for a particular device. The trusted core network 402 may also include an eSIM server 420 for provisioning and authenticating eSIMS for network access by one or more trusted or untrusted (new) information handling systems. The eSIM server 420 may an integrated circuit card identification number (ICCID) for one or more trusted or untrusted (new) information handling systems, an international mobile subscriber identity (IMSI) numbers for one or more trusted or untrusted (new) information handling systems, security authentication and ciphering information for one or more trusted or untrusted (new) information handling systems, temporary information related to a local network associated with one or more trusted or untrusted (new) information handling systems, a list of the services that the one or more trusted or untrusted (new) information handling systems have access to, and two passwords: a personal identification number (PIN) for ordinary use, and a personal unblocking key (PUK) for PIN unlocking.

Still referring to FIG. 4, the trusted core network 402 may include a packet data gateway (PGW) 422. The PGW 422 may serve as an ingress and egress point to the trusted core network 402 from a packet data network (PDN), e.g., the Internet. When the trusted core network 402 establishes an evolved packet system (EPS) bearer to a given PDN, the PGW 422 may serve an attachment point to that PDN for the life of the EPS bearer. The PGW 422 may also provide packet filtering in order to ensure that downlink data has an appropriate quality of service (QoS) applied. The trusted core network 402 may also include a home subscriber server (HSS) 424. The HSS 424 may act as a master database for a given subscriber and can act as a central repository of information for network nodes. The HSS 424 may contain certain subscriber related information, such as user identification, security, location, and subscription profile. As illustrated the trusted core network 402 may also include a serving gateway (SGW) 426 and the SGW 426 may serve as the user data plane ingress and egress point of an evolved—universal terrestrial radio access network (E-UTRAN) of the trusted core network 402. When a subscriber moves around the E-UTRAN, the point of attachment of a trusted information handling system to the trusted core network 402 remains fixed at the SGW 426—unless the network decides that a SGW relocation is needed. The SGW 426 may also provide lawful interception of subscriber traffic and downlink data buffering.

FIG. 4 also indicates that the trusted core network 402 may include a charging function (CHF) 428. The CHF 428 may provide support for both prepaid and postpaid billing within the same charging system. The trusted core network 402 may also include an access network discovery and selection function (ANDSF) 430. In a particular aspect, the ANDSF 430 may assist the trusted core network 402 to discover offload destinations, such as Wi-Fi, WiMAX, and CDMA2000 networks. As such, the ANDSF 430 may provide the trusted information handling system with information from the trusted core network 402 about available alternative wireless networks and may enforce policies for selecting and using those networks. As depicted, the trusted core network 402 may include a session management function (SMF) module 432. The SMF module 432 may provide certain functions within a 5G network. For examples, the SMF module 432 may provide protocol data unit (PDU) session management, IP address allocation, general packet radio service (GPRS) tunnelling protocol— user (GTP-U) tunnel management, and downlink notification management. The trusted core network 402 may also include a policy control function (PCF) 434 and a unified data management (UDM) module 436. The PCF 434 may support the unified policy framework that governs network behavior. Further, the PCF 434, may provide policy rules to one or more control plane functions to enforce them. The PCF 434 may retrieve subscription information from the UDM 436 in order to properly enforce the relevant policy rules. In turn, the UDM 436 may store subscription information and the long-term security credentials used for authentication and key agreement (AKA).

Still referring to FIG. 4, the RAN 406 of the remote, transitive bootstrapping system 400 may include a next generation node b (gNB) base station 440 that may provide wireless connectivity to a 5G radio network. The RAN 406 may also include an evolved node b (eNB) which may serve as the base station for an E-UTRAN. As shown, the RAN 406 may also include a RAN intelligent controller (RIC) 444. The RIC 44 may be responsible for the operation of the RAN 406 and may be responsible for optimization procedures. For example, these optimization procedures may include radio connection management, mobility management, QoS management, edge services, interference management, radio resource management, higher layer procedure optimization, policy optimization in RAN, and providing guidance, parameters, policies and AI/ML models to support the network operation. In a particular aspect, the RIC 444 may be a non real-time MC, a near real-time RIC, or a combination thereof. FIG. 4 also indicates that the RAN 406 may include a Wi-Fi link 446 and a Bluetooth link 448 in some embodiments.

FIG. 4 further shows that the trusted and authenticated information handling system 404 may include an operating system (OS) 450. The OS 450 may include one or more applications. For example, the OS 450 may include an artificial intelligence (AI) agent, a machine learning (ML) agent, or a combination thereof. Additionally, the OS 450 may include a network application programming interface (NW API). The OS 450 may include a temporary hotspot enabler which may respond to a signal from the trusted core network 402 or an M&O module, described below, at the cloud and edge information handling system 408 in order to enable a hotspot at the trusted and authenticated information handling system 404. The OS 450 may also include the other transitive bootstrap functions provided by the trusted and authenticated information handling system 404, described below in conjunction with the flow charts.

As shown, the trusted and authenticated information handling system 404 may include an embedded controller/local profile assistant (EC/LPA) module 452 and the EC/LPA module 452 may be coupled to the OS 450. The EC/LPA module 452 may include a temporary hotspot enabler that may work with the OS 450. In the alternative, the EC/LPA module 452 may be respond to a signal from the trusted core network 402 or from the M&O module, described below, at the cloud and edge information handling system 408 in order to enable a hotspot at the trusted and authenticated information handling system 404. Further, the EC/LPA module 452 may include local credentials for the trusted and authenticated information handling system 404. These local credentials may be used to verify the authentication of the trusted and authenticated information handling system 404 with the trusted core network 402 to allow RAN access and access to the trusted core network 402 resources and the cloud and edge information handling system 408. The EC/LPA module 452 may also include the other transitive bootstrap functions provided by the trusted and authenticated information handling system 404, described below in conjunction with the flow charts. The EC/LPA module 452 may also manage the trust chain functionality provided by the trusted and authentication information handling system 404 for transitive access and provisioning of an untrusted (new) information handling system, described below in conjunction with the flow charts.

The trusted and authenticated information handling system 404 may include a dynamic antenna re-configuration wireless integration (DARWIN) module 454. As shown, the DARWIN module 454 may be connected to the EC/LPA 452 and the OS 450.

The trusted and authenticated information handling system 404 may also include a Wi-Fi module 456 and the Wi-Fi module 456 may be coupled to the EC/LPA 452. In particular, the Wi-Fi module 456 may be an out-of-band (OOB) Wi-Fi module. A Bluetooth (BT)/Wi-Fi module 458 may be connected to the DARWIN module 454. The BT/Wi-Fi module 458 may act as a host for an untrusted (new) information handling system (not shown in FIG. 4) that may use the trusted and authorized information handling system 404 as a bootstrapping bridge, as described in greater detail below. The trusted and authorized information handling system 404 may further include a WWAN module 460. The WWAN module 460 may be coupled to the Darwin module 454. The WWAN module 460 may act as a host for an untrusted (new) information handling system (not shown in FIG. 4) while the untrusted (new) information handling system is bootstrapped via a transitive bootstrapping process provide by the trusted and authorized information handling system 404. Moreover, the WWAN module 460 may have eSIM capability, embedded UICC (eUICC) capability, or a combination thereof. As illustrated in FIG. 4, the trusted and authenticated information handling system 404 may include a plurality of WWAN antennas 462. The WWAN antennas 462 may be 4G antennas, 5G antennas, or a combination thereof. Further, the trusted and authenticated information handling system 404 may include a plurality of WLAN antennas 464. In particular, the WLAN antennas 464 may be Wi-Fi or Bluetooth WLAN antennas. The trusted and authenticated information handling system 404 may also include a near field communication (NFC) module 466. It is to be understood that the OS 450, the EC/LPA 452, the Darwin module 454, the OOB Wi-Fi module 456, the BT/Wi-Fi module 458, WWAN module 460, the WWAN antennas 462, the WLAN antennas 464, and the NFC module 466 may collectively be referred to as a bootstrap bridge 468. Moreover, the bootstrap bridge 468 may be used to facilitate the transitive bootstrapping of an untrusted (new) information handling system (not shown in FIG. 4) via the trusted and authenticated information handling system 404.

In particular, the bootstrap bridge 468 may provide a transitive bootstrapping process for an untrusted (new) information handling system that may communicate wirelessly with the bootstrap bridge. Moreover, the bootstrap bridge 468 may include a temporary hotspot for communicating with the untrusted (new) information handling system and a secure gateway for communicating with the trusted core network 402. The temporary hotspot may be provided by the Wi-Fi module 456, the BT/Wi-Fi module 458, the WWAN module 460, or a combination thereof. During the transitive bootstrapping process, the bootstrap bridge 468 may receive an authentication request from the untrusted (new) information handling system via the temporary hotspot and the authentication request may include an untrusted (new) information handling system identification (ID) from local credentials stored on the untrusted (new) information handling system by a manufacturer of the untrusted (new) information handling system. The bootstrap bridge 468 may transmit a request for challenge for the untrusted (new) information handling system ID to the trusted core network 402 via the secure gateway on behalf of the untrusted (new) information handling system upon initiation of a simple command at the trusted information handling system, e.g., a simple click on a virtual button, a press of an actual button that is temporarily designated to initiate the bootstrapping process, or some other simple one-step action.

During the transitive bootstrapping process, the bootstrap bridge 468 within the trusted and authenticated information handling system 404 may receive the challenge for the untrusted (new) information handling system ID from the trusted core network 402 via the secure gateway and transmit the challenge to the untrusted (new) information handling system via the temporary hotspot. Moreover, the bootstrap bridge 468 within the trusted and authenticated information handling system 404 may receive a response to the challenge from the untrusted (new) information handling system via the secure gateway and transmits the response to the challenge to the trusted core network 402, the cloud and edge information handling system 408, or a combination thereof, via the temporary hotspot.

In another aspect, the bootstrap bridge 468 within the trusted and authenticated information handling system 404 may receive a temporary network credentials profile, for the untrusted (new) information handling system via the secure gateway upon verification that the response to the challenge is correct at the trusted core network 402. Thereafter, the bootstrap bridge 468 may send the temporary network credentials profile for the untrusted (new) information handling system to the untrusted (new) information handling system via the temporary gateway. In a particular aspect, the bootstrap bridge 468 within the trusted and authenticated information handling system 404 may operate on a temporary basis and with several limitations on use or authentication attempts. Further, the bootstrap bridge 468 within the trusted and authenticated information handling system 404 may be enabled and disabled remotely by the trusted core network 402, by an M&O module (described below) at the cloud and edge information handling system 408, or a combination thereof. In particular, the bootstrap bridge 468 within the trusted and authenticated information handling system 404 may be enabled after the trusted and authenticated information handling system 404 is authenticated with the trusted core network 402, the M&O module (described below) at the cloud and edge information handling system 408, or a combination thereof.

Still referring to FIG. 4, the cloud and edge information handling system 408 may include one or more enterprise applications 470. The cloud and edge information handling system 408 may also include one or more other applications 472. In addition, as depicted, the cloud and edge information handling system 408 may include a mobile edge cloud (MEC) module 474. The MEC module 474 may be an enterprise MEC. Further, the MEC module 474 may provide cloud-like capability at the edge of a network. The MEC module 474 may decrease the latency and increase the performance of high-bandwidth applications. FIG. 4 also indicates that the cloud and edge information handling system 408 may include a management and operations (M&O) module 476. The M&O 476 module may provide the backend functionality of the transitive bootstrapping process illustrated in the flow charts and described below. Further, the M&O module 476 may perform much of the authentication work on the network side, either directly, or through the trusted core network 402. The M&O 476 may get the manufacturer's temporary credentials for the an untrusted (new) information handling system, authenticate the temporary credentials, and allow untrusted network access via a secure gateway. Then, the untrusted (new) information handling system may begin direct access to an eSIM server for provisioning for full access.

For example, the M&O module 476 may authenticate the trusted and authenticated information handlings system 404. The M&O module 476 may authenticate an untrusted (new) information handling system that is seeking authentication and bootstrapping via the trusted and authenticated information handling system 404. Also, the M&O module 476 may transmit the eSIM profile associated with the untrusted (new) information handling system to the untrusted (new) information handling system via a separately established link to the untrusted (new) information handling system.

In a particular aspect, many of the functions of the trusted core network system 402 used to bootstrap the untrusted (new) information handling system are provided to the trusted core network system 402 via the M&O module 476 within the cloud and edge information handling system 408. In an embodiment, the bootstrap functions at the trusted core network system 402 may be managed by the M&O module 476 within the cloud and edge information handling system 408. Further, much of the bootstrapping is driven via out-of-band communication between the trusted core network system 402 and the cloud and edge information handling system 408, e.g., with the M&O module 476 therein.

Figure 5:
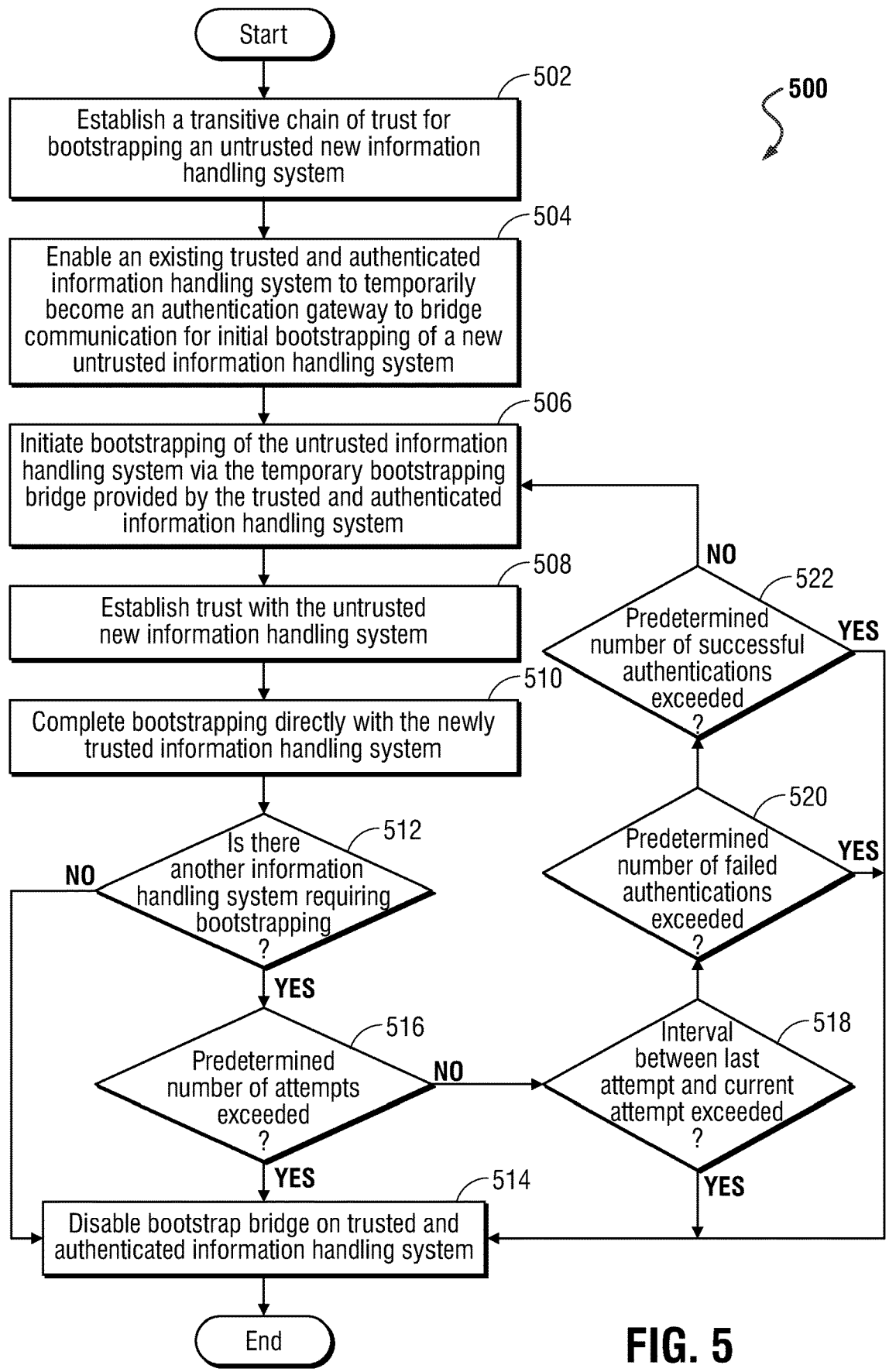
FIG. 5 is a flow diagram illustrating a method of bootstrapping an untrusted (new) information handling system via a trusted and authenticated information handling system according to an embodiment of the present disclosure.

Referring now to FIG. 5, a flow diagram of a method of bootstrapping an untrusted (new) information handling system via a trusted and authenticated information handling system is illustrated and is generally designated 500. As shown, the method 500 may commence at block 502 in which the method 500 may include establishing a transitive chain of trust for bootstrapping an untrusted (new) information handling system 308. At block 504, the method 500 may include enabling an existing trusted and authenticated information handling system 304, 404 to temporarily become an authentication gateway to bridge communication for initial bootstrapping of an untrusted (new) information handling system 308. Also, in an embodiment, the trusted and authenticated information handling system 304, acting as a bootstrap device, may receive and (temporarily) store accepted authentication credentials, policies, as well as rules (for new untrusted information handling systems to authenticate against from the backend-system, and challenges for the challenge-response message exchange between trusted and authenticated information handling systems and untrusted information handling systems while performing an authentication procedure. Moving to block 506, the method may include initiating bootstrapping of the untrusted (new) information handling system 308 via the temporary bootstrapping bridge provided by the trusted and authenticated information handling system 304, 404. For example, in exchange of manufacturer supplied local credentials from the untrusted (new) information handling system 308 and with one-click, or command, establishing a secure gateway temporary bootstrap bridge via the trusted and authenticated information handling system 304, 404. At block 508, the method 500 may include establishing trust with the untrusted (new) information handling system 308 via the trusted and authenticated information handling system 304, 404. Moving to block 510, the method 500 may include completing the bootstrapping process directly with the newly trusted and authenticated information handling system 308 to provision eSIM credentials and authenticate network access for the newly trusted information handling system 308. In a particular embodiment of the present disclosure, the provided bootstrap connectivity upon valid authentication may be a limited service which may only provide service to a selected number of IP addresses, APNs, or domains that are used to complete the backend authentication. A number of request attempts, connection speed, and limited throughput budget can be enforced by the trusted and authenticated information handling system while acting as a bootstrap device. In an embodiment, unlimited connections may not be provided.

At decision 512, the method 500 may include determining if there is another information handling system requiring bootstrapping. If there is not another information handling system that requires bootstrapping, the method 500 may proceed to block 514. At block 514, the method 500 may include disabling the bootstrap bridge on the trusted and authenticated information handling system 304, 404. Thereafter, the method 500 may end. Returning to decision 512, if there is another information handling system that requires bootstrapping, the method 500 may proceed to decision 516. At decision 516, the method 500 may determine if a predetermined number of attempts to bootstrap new devices exceeded. This may prevent misuse of the transitive bootstrapping functionality provided by the trusted and authenticated information handling system 304, 404. At decision 516, if the predetermined number of attempts to bootstrap new devices is exceeded, the method 500 may proceed to block 514 and the method 500 may include disabling the bootstrap bridge on the trusted and authenticated handling system 304, 404. Thereafter, the method 500 may end.

Returning to decision 516, if the predetermined number of attempts to bootstrap new devices has not been exceeded, the method 500 may proceed to decision 518 and the method 500 may include determining whether an interval between the last attempt and current attempt has been exceeded. If the interval between the last attempt and the current attempt has been exceeded, the method 500 may proceed to block 514 and the method 500 may, once again, include may include disabling the bootstrap bridge on the trusted and authenticated handling system 304, 404. Then, the method 500 may end. Returning to decision 518, if the interval between the last attempt and the current attempt has not been exceeded, the method 500 may proceed to decision 520. At decision 520, the method 500 may include determining whether a predetermined number of failed authentications has been exceeded. If the predetermined number of failed authentications, e.g., due to failed credentials or due to failed challenge-responses, has indeed been exceeded, the method 500 may proceed to block 514 where the method 500 may include disabling the bootstrap bridge on the trusted and authenticated handling system 304, 404. The method 500 may then end. On the other hand, at decision 520, if the predetermined number of failed authentications has not been exceeded, the method 500 may proceed to decision 522.

At decision 522, the method 500 may include determining whether a predetermined number of successful authentications has been exceeded in an optional embodiment. If the predetermined number of successful authentications has actually been exceeded, the method 500 may proceed to block 514 and the method 500 may include disabling the bootstrap bridge on the trusted and authenticated handling system 304, 404. Thereafter, method 500 may end. Returning to decision 522, if the predetermined number of successful authentications has not been exceeded, the method 500 may return to block 506 and the method 500, once again, may include initiating bootstrapping of the next untrusted (new) information handling system 308 via the temporary bootstrapping bridge provided by the trusted and authenticated information handling system 304, 404. Thereafter, the method 500 may proceed as described above. The transitive bootstrapping process provided by the trusted and authenticated information handling system 304, 404 is intended to be temporary in order to limit the use of the transitive bootstrapping process to prevent overuse, misuse, and to prevent untrusted (new) information handling systems that are not intended to be bootstrapped to a network from actually being bootstrapped to a particular network. Moreover, decisions 516, 518, 520, and 522 help ensure that the transitive bootstrapping process provided by the trusted and authenticated information handling system 304, 404 is indeed temporary.

Figure 6:
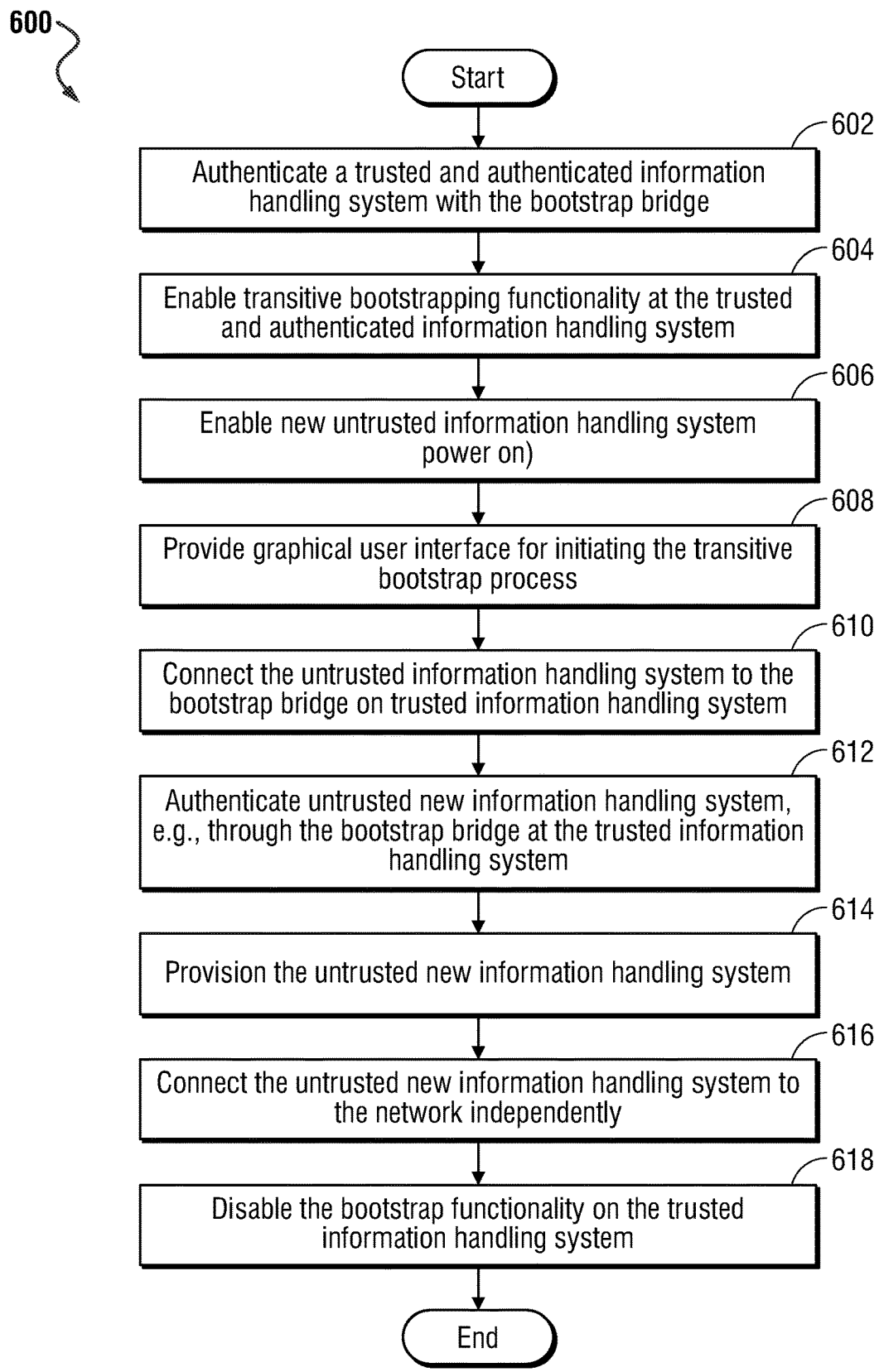
FIG. 6 is a flow diagram illustrating a method of bootstrapping an untrusted (new) information handling system via a trusted and authenticated information handling system according to another embodiment of the present disclosure.

Referring now to FIG. 6, a flow diagram of another method of bootstrapping an untrusted (new) information handling system via a trusted and authenticated information handling system is illustrated and is generally designated 600. As shown, the method 600 may commence at block 602 in which the method 600 may include authenticating a trusted and authenticated information handling system 304, 404. The trusted and authenticated information handling system 304, 404 may be authenticated by transmitting local credentials 324 to the trusted core network 302. Once the local credentials 324 are verified by the trusted core network 302, e.g., at the authentication server 316, the trusted and authenticated information handling system 304, 404 may be considered authenticated.

At block 604, the method 600 may include enabling transitive bootstrap functionality at the trusted and authenticated information handling system 304, 404. In a particular aspect, the transitive bootstrap functionality may be provided by a bootstrap bridge within an information handling system, e.g., the bootstrap bridge 468 (FIG. 4) in the trusted and authenticated information handling system 404 (FIG. 4). The bootstrap bridge 468 may be essentially dormant, or disabled, until the trusted and authentication information handling system 304, 404, 404 is authenticated with the trusted core network 302. Once the trusted and authenticated information handling system 304, 404 is deemed authenticated, the trusted core network 302 may send a signal to the trusted and authenticated information handling system 304, 404, e.g., to the EC/LPA module 452 and the EC/LPA module 452 can enable a temporary hotspot at the trusted and authenticated information handling system 304, 404 and enable the transitive bootstrap functionality provided by the bootstrap bridge 468 upon request from a nearby untrusted (new) information handling system 308.

In a particular aspect, the transitive bootstrap functionality may be temporary, may be limited for a particular number of unsuccessful authentication tries, or may only be used for a predetermined number of successful bootstraps, a predetermined number of provisionings, a predetermined number of successful authentications, or a combination thereof. In another aspect, the transitive bootstrap function may only be available for a predetermined amount of time and when that time expires, the transitive bootstrap functionality may be automatically disabled. Moving to block 606, the method 600 may include enabling an untrusted (new) information handling system 308. The untrusted (new) information handling system 308 may be enabled by powering on the untrusted (new) information handling system 308. At block 608, the method 600 may include providing a graphical user interface (GUI) for initiating the transitive bootstrap process. The GUI may include a touch button, a quick response (QR) code, access to a cloud, a web address, a near field (NF) proximity link, or some other indicator that the user of both the trusted information handling system 304, 404 and the untrusted (new) information handling system 308 may utilize in order to initiate the transitive bootstrapping process at the trusted and authenticated information handling system 304, 404.

Continuing to block 610, the method 600 may include connecting the untrusted (new) information handling system 308 to the bootstrap bridge 468 on the trusted and authenticated information handling system 304, 404. In particular, the untrusted (new) information handling system 308 may connect to the bootstrap bridge on the trusted and authenticated handling system 304, 404 via a temporary hotspot provided by the bootstrap bridge 468. The connection may be made via the BT/Wi-Fi module 458, the NFC module 466, or a combination thereof. Returning to the description of FIG. 6, at block 612, the method 600 may include authenticating the untrusted (new) information handling system 308 with a trusted core network 302, such as an M&O module 476 or an edge computing device 474 provided to manage the trusted and authenticated information handling system 304, 404 or the untrusted (new) information handling system 308 for communication, e.g., through the bootstrap bridge at the trusted and authenticated information handling system 304, 404. Moreover, at block 614, the method 600 may include provisioning the untrusted (new) information handling system 308. During the provisioning process, the untrusted (new) information handling system 308 may be authenticated with a trusted core network 302 that is responsible for provisioning new information handling systems. In an embodiment, the untrusted (new) information handling system 308 may receive an eSIM profile and local credentials from a backend information handling system in the trusted core network 402 or the M&O module 476 or MEC 474 of the cloud and edge information handling system 408. Further, the untrusted (new) information handling system 308 may be connected to a local network provided by the owner of the untrusted (new) information handling system 308.

Proceeding to block 616, the method 600 may include connecting the untrusted (new) information handling system 308 to the RAN network independently. In other words, the untrusted (new) information handling system 308 may now be considered trusted and it may communicate directly with one or more backend information handling systems of a trusted core network 402 via independent RAN access and may no longer communicate with the trusted core network 402 and RAN 306, 406 via the trusted and authenticated information handling system 302. Since the transitive bootstrapping functionality at the trusted and authenticated information handling system 302 is no longer needed by the untrusted (new) information handling system 308, the method 600 may continue to block 618 where the method 600 may include disabling the bootstrap functionality provided by the bootstrap bridge on the trusted and authenticated information handling system 304, 404. Accordingly, the transitive bootstrapping functionality may no longer be available at the trusted and authenticated information handling system 308. Thereafter, the method 600 may end.

Figure 7A:
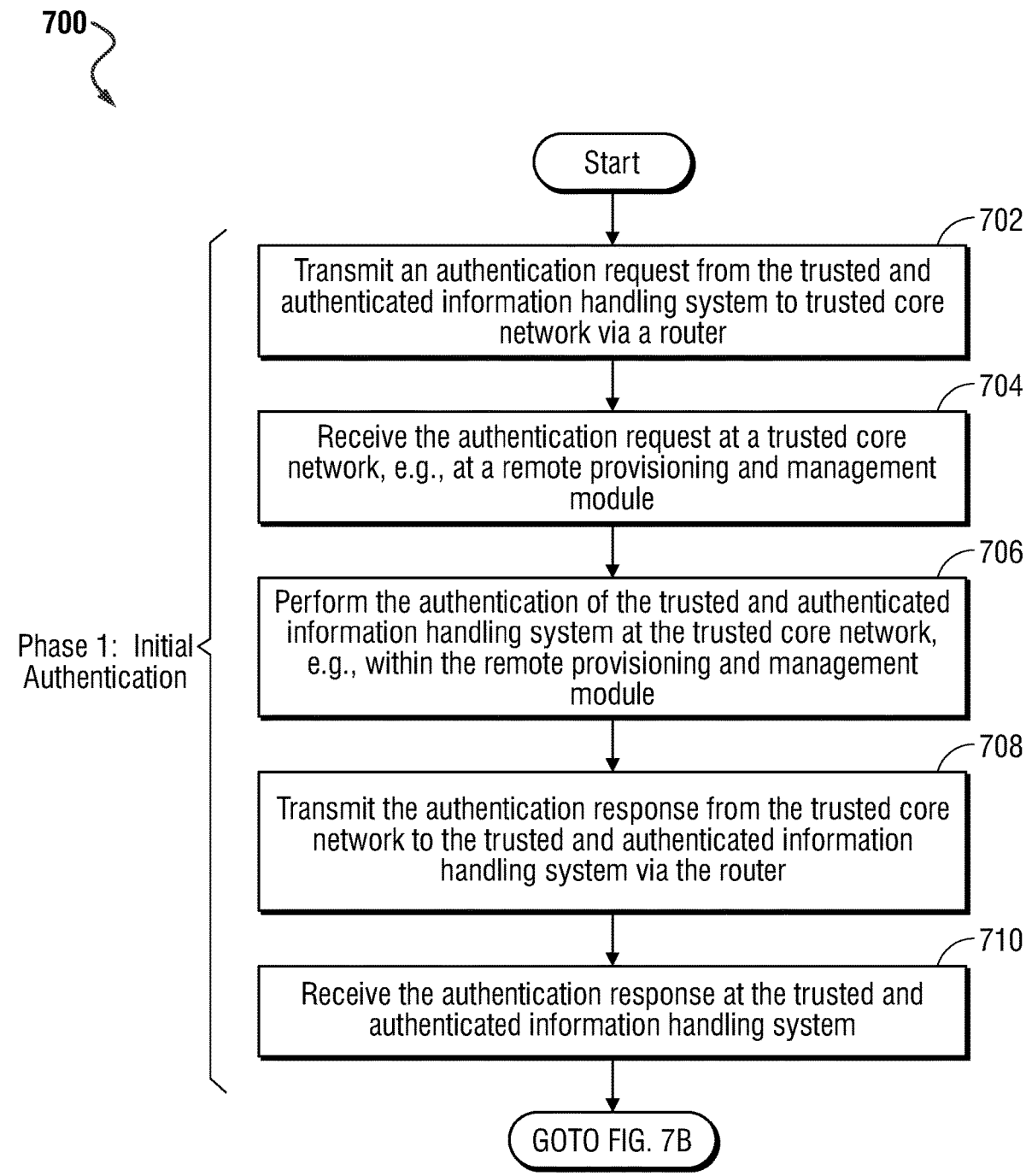
FIG. 7A through FIG. 7E are flow diagrams illustrating a method of bootstrapping an untrusted (new) information handling system via a trusted and authenticated information handling system according to yet another embodiment of the present disclosure.
Figure 7B:
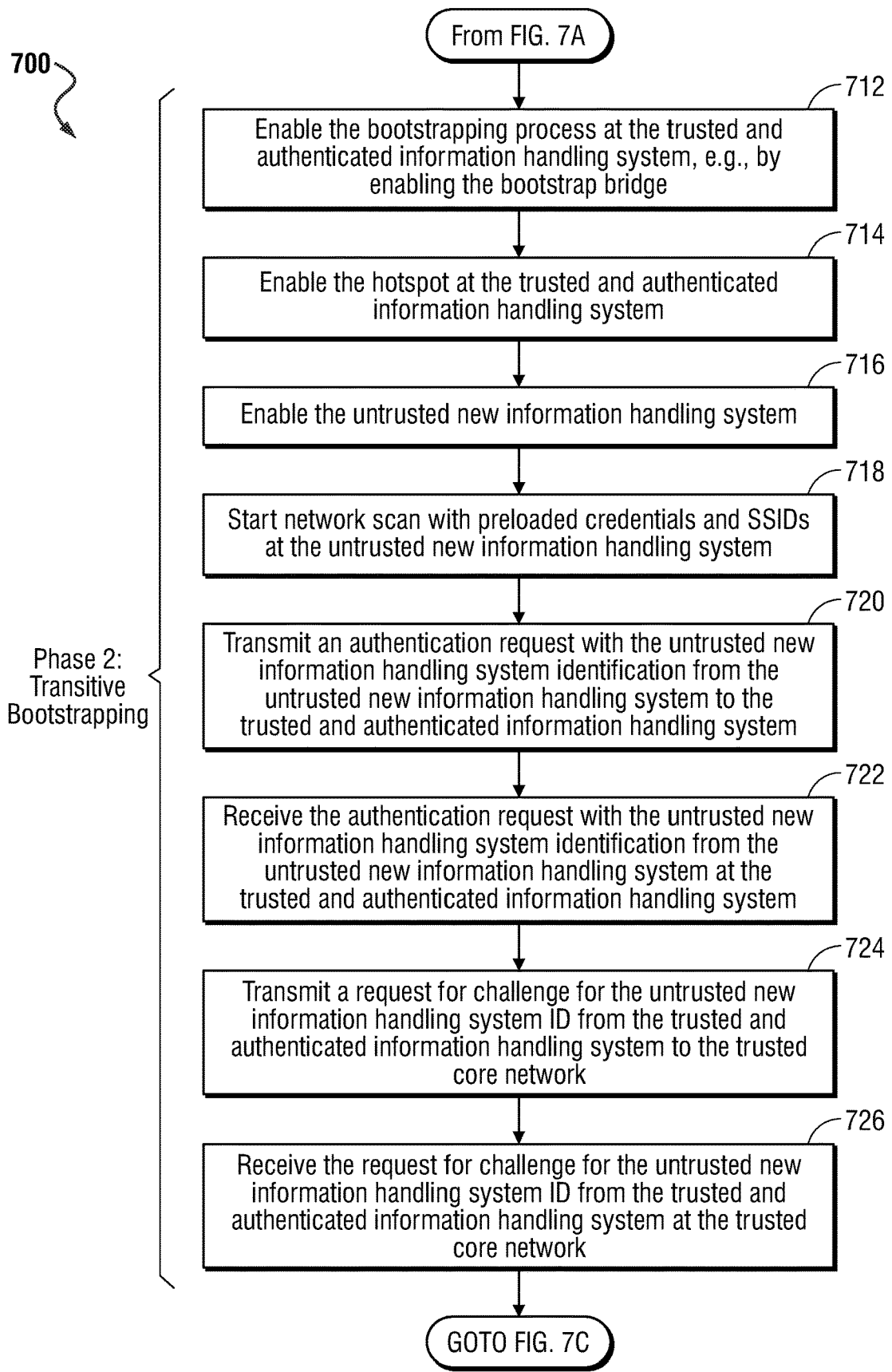
Figure 7C:
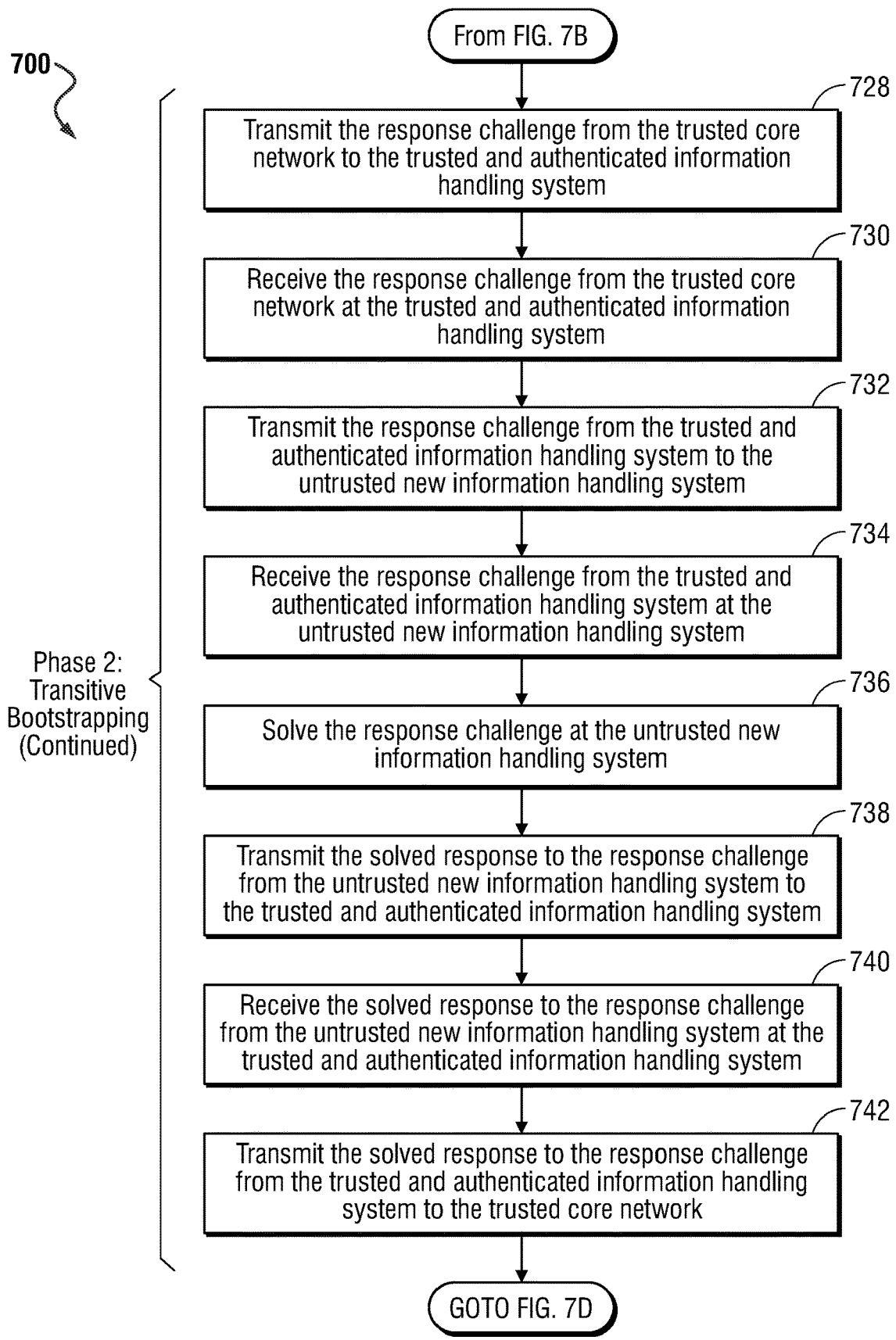
Figure 7D:
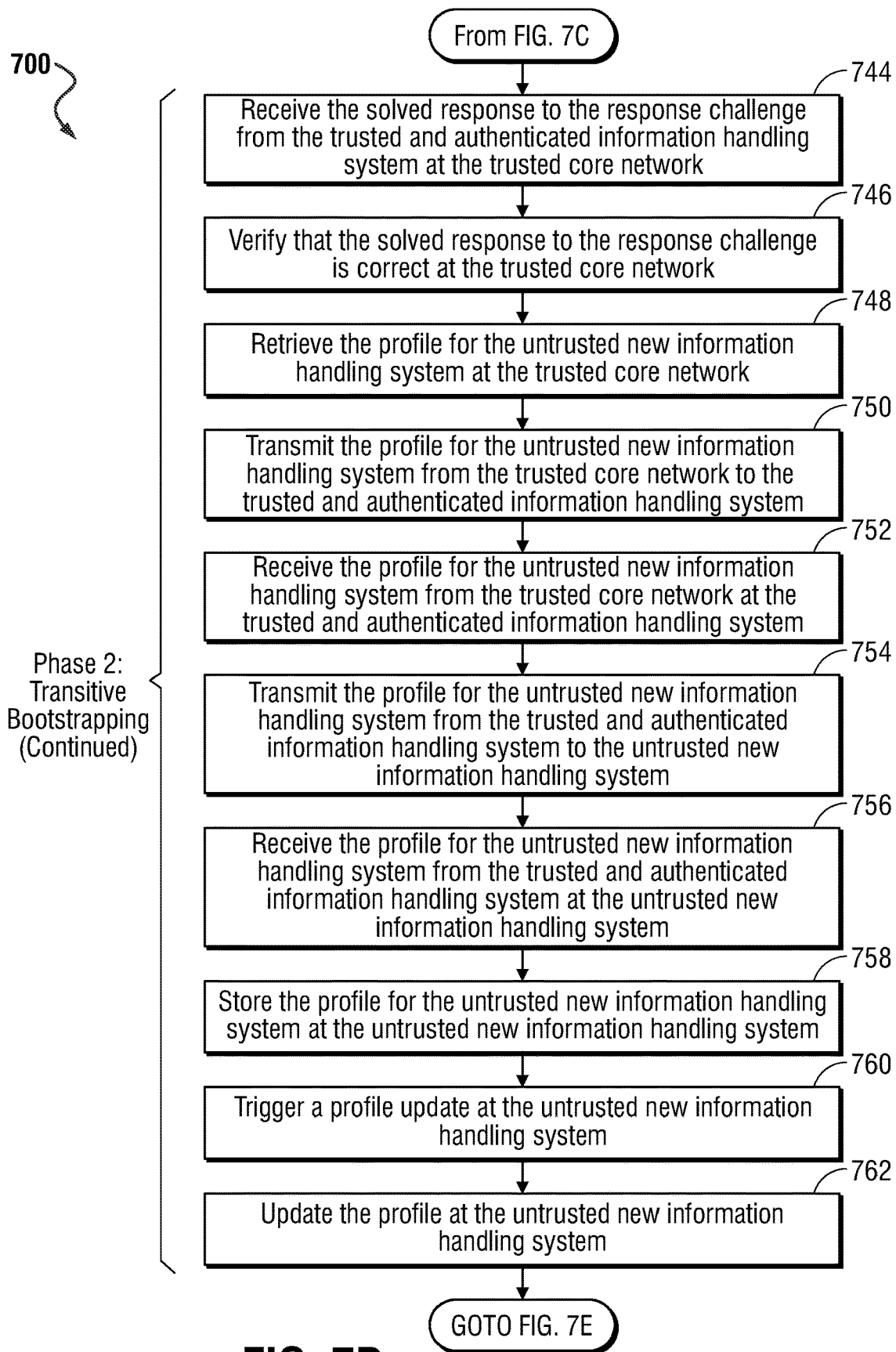
Figure 7E:
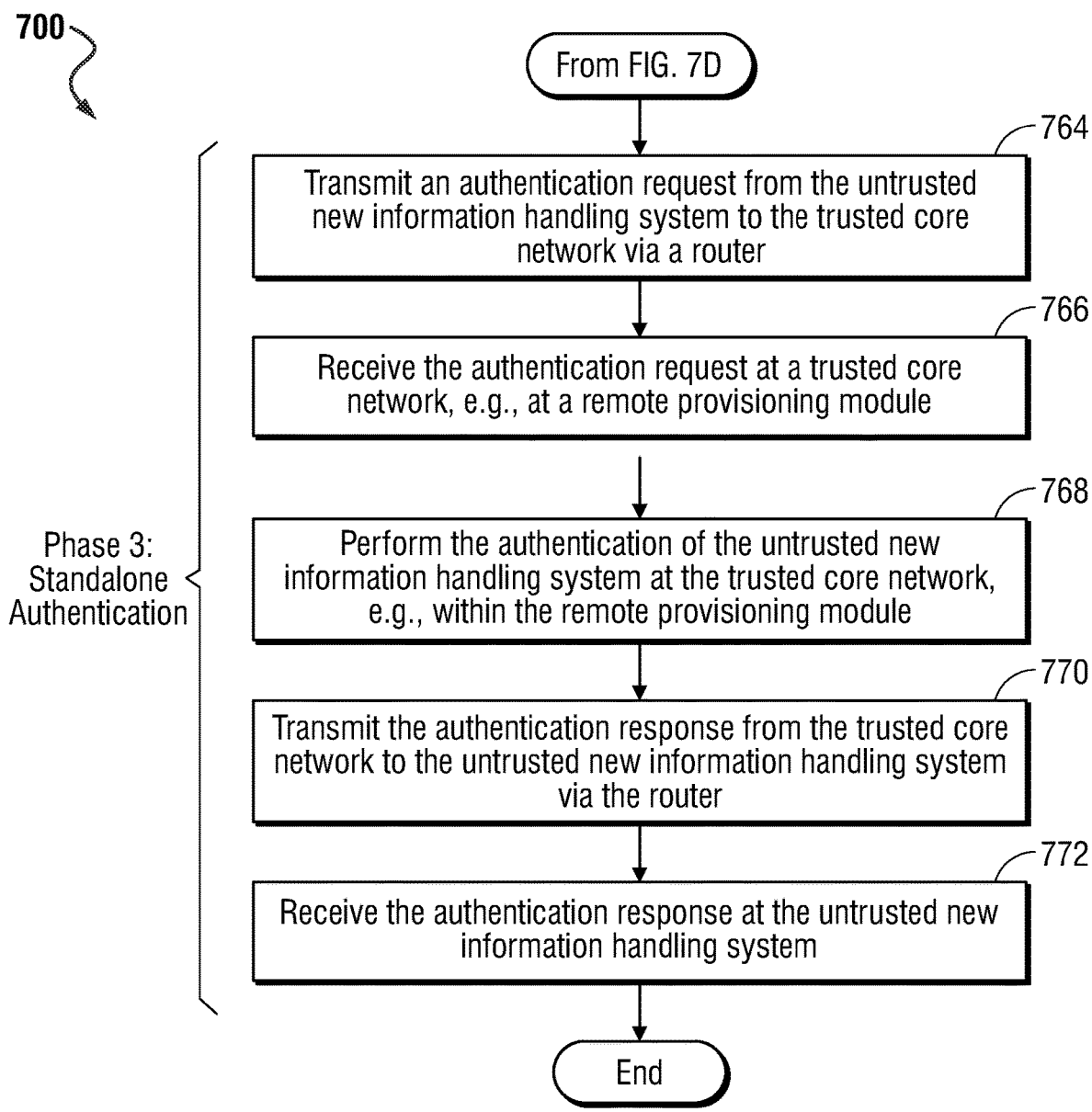

FIG. 7A through FIG. 7E illustrate a flow diagram of still another method 700 of bootstrapping an untrusted (new) information handling system via a trusted and authenticated information handling system. As shown, the method 700 may include three phases. Phase one of the method 700 is the initial authentication of the trusted and authenticated information handling system 304, 404 and is illustrated in FIG. 7A. Phase two of the method 700 is the transitive bootstrapping of the untrusted (new) information handling system 308 that occurs via the bootstrapping bridge at the trusted and authenticated information handling system 308. Phase two of the method 700 is depicted in FIG. 7B through FIG. 7D. Phase three of the method 700 is the standalone authentication of the untrusted (new) information handling system 308 directly with the trusted core network 302 with the trusted and authenticated information handling system 304, 404 no longer acting as a go-between or proxy with the bootstrapping bridge. Phase three of the method 700 is shown in FIG. 7E.

Returning to the description of the method 700, beginning at block 702, phase one of the method 700 may include transmitting an authentication request from the trusted and authenticated information handling system 304, 404 to trusted core network 302 via a router 306. The authentication request may be initiated via a GUI at the trusted and authenticated information handling system 304, 404, via a GUI at the untrusted (new information handling system. The authentication request may be sent in response to toggling a touch button, scanning a quick response (QR) code, toggling an actual button, or some other simple one step operation. The authentication request may include a system ID from local credentials stored on the untrusted (new) information handling system 308 by a manufacturer of the untrusted (new) information handling system 308, a system ID from local credentials stored on the trusted and authenticated information handling system 304, 404, or a combination thereof. The system ID may be temporary credentials that are preloaded by the manufacture. Further, the system ID may be hardware based or software based and may be shared with the trusted core network 302, e.g., the back end.

In particular, the authentication request may be transmitted to the router 306, and the trusted core network 302, via a secure gateway 320 at the trusted and authenticated information handling system 304, 404. At block 704, phase one of the method 700 may include receiving the authentication request at a trusted core network 302, e.g., at a remote provisioning and management module 312. Thereafter, at block 706, phase one of the method 700 may include performing the authentication of the trusted and authenticated information handling system 304, 404 at the trusted core network 302, e.g., within the remote provisioning and management module 312. Moving to block 708, phase one of the method 700 may include transmitting the authentication response from the trusted core network 302 to the trusted and authenticated information handling system 304, 404 via the router 306. At block 710, phase one of the method 700 may include receiving the authentication response at the trusted and authenticated information handling system 304, 404. In particular, the authentication response may be received at the trusted and authenticated information handling system 304, 404 via the secure gateway 320. The method 700 may then move to block 712 at FIG. 7B.

At block 712, the method 700 may enter phase two and may include enabling the bootstrapping process at the trusted and authenticated information handling system 304, 404, e.g., by enabling the bootstrap bridge within the trusted and authenticated information handling system 304, 404. In a particular aspect, the bootstrap bridge within the trusted and authenticated information handling system 304, 404 may be enabled in response to a signal from the trusted core network 302, 402, e.g., from a signal from the M&O module 476 at the cloud and edge information handling system 408 that gets passed along through the trusted core network 302, 402. The signal from the M&O module 476 may be an out-of-band communication.

Moving to block 714, phase two of the method 700 may include enabling the temporary network enabler 322 at the trusted and authenticated information handling system 304, 404. The temporary network enabler 322 may include code instructions to activate a wireless hot spot for connecting to the untrusted (new) information handling system 308. Further, the temporary network enabler 322 at the trusted and authenticated information handling system 304, 404 may be enabled remotely in response to a signal from the trusted core network 302 after the trusted and authenticated information handling system 304, 404 is deemed authenticated. Proceeding to block 716, phase two of the method 700 may include enabling the untrusted (new) information handling system 308. The untrusted (new) information handling system 308 may be enabled by turning the power on at the untrusted (new) information handling system 308. At block 718, phase two of the method 700 may include starting a network scan with preloaded credentials and SSIDs at the untrusted (new) information handling system 308. At block 720, phase two of the method 700 may include transmitting an authentication request with the untrusted (new) information handling system identification from the untrusted (new) information handling system 308 to the trusted and authenticated information handling system 304, 404.

It is to be understood that at least a portion of phase two of the method 700 may occur concurrently with phase one of the method 700. In other words, while the trusted and authenticated information handling system 304, 404 is being authenticated with the trusted core network 302, 304, an IT specialist may start the untrusted (new) information handling system 308. In response to a one-click command at the trusted and authenticated information handling system, phase one of the method 700 may be initiated and shortly thereafter, phase two of the method 700 may take place. In a particular aspect, phase two of the method 700 may only occur if the untrusted (new) information handling system 308 is in close proximity to the trusted and authenticated information handling system 304, 404. This proximity may be verified via NFC communication between the trusted and authenticated information handling system 304, 404 and the untrusted (new) information handling system 308.

Moving to block 722, the second phase of the method 700 may include receiving the authentication request with the untrusted (new) information handling system identification from the untrusted (new) information handling system 308 at the trusted and authenticated information handling system 304, 404. In particular, the authentication request may be received at the trusted and authenticated information handling system 304, 404 via the temporary network enabler 322. At block 724, the second phase of the method 700 may include transmitting a request for challenge for the untrusted (new) information handling system ID from the trusted and authenticated information handling system 304, 404 to the trusted core network 302. The request for challenge may be transmitted to the trusted core network 302 via the secure gateway 320 at the trusted and authenticated information handling system 304. In particular, the challenge may be a secure or encrypted challenge that may only be solved using a unique key stored at the untrusted (new) information handling system 308 and associated with the untrusted (new) information handling system ID. In one embodiment, the unique key may be found in the temporary credentials. At block 726, the second phase of the method 700 may include receiving the request for challenge for the untrusted (new) information handling system ID from the trusted and authenticated information handling system 304, 404 at the trusted core network 302. Thereafter, phase two of the method 700 may proceed to block 728 of FIG. 7C.

At block 728 of FIG. 7C, the second phase of the method 700 may include transmitting the response challenge from the trusted core network 302 to the trusted and authenticated information handling system 304, 404. At block 730, the second phase of the method 700 may include receiving the response challenge from the trusted core network 302 at the trusted and authenticated information handling system 304, 404. In particular, the response challenge may be received at the trusted and authenticated information handling system 304, 404 via the secure gateway 320. In a particular aspect, the response challenge may be received at the trusted and authenticated information handling system 304, 404 via an out-of-band Wi-Fi communication between and M&O module and the trusted and authenticated information handling system 304, 404.

At block 732, the second phase of the method 700 may include transmitting the response challenge from the trusted and authenticated information handling system 304, 404 to the untrusted (new) information handling system 308. In a particular aspect, the response challenge may be transmitted to the untrusted (new) information handling system 308 via the temporary network enabler 322 at the trusted and authenticated information handling system 304. Moving to block 734, the second phase of the method 700 may include receiving the response challenge from the trusted and authenticated information handling system 304, 404 at the untrusted (new) information handling system 308. At block 736, the second phase of the method 700 may include solving the response challenge at the untrusted (new) information handling system 308. In a particular aspect, the response challenge may be solved at the untrusted (new) information handling system 308 using the key associated with the IMSI number stored within the eSIM of the untrusted (new) information handling system 308.

Thereafter, at block 738, the second phase of the method 700 may include transmitting the solved response to the response challenge from the untrusted (new) information handling system 308 to the trusted and authenticated information handling system 304, 404. At block 740, the second phase of the method 700 may include receiving the solved response to the response challenge from the untrusted (new) information handling system 308 at the trusted and authenticated information handling system 304, 404. The solved response to the response challenge from the untrusted (new) information handling system 308 may be received at the trusted and authenticated information handling system 308 via the temporary network enabler 322. Proceeding to block 742, the second phase of the method 700 may include transmitting the solved response to the response challenge from the trusted and authenticated information handling system 304, 404 to the trusted core network 302. In particular, the solved response to the response challenge from the trusted and authenticated information handling system 304, 404 may be transmitted to the trusted core network 302 via the secure gateway 320 within the trusted and authenticated information handling system 304. In a particular aspect, the trusted core network 302 may monitor the number of unsuccessful attempts to solve the response challenge and if the number of unsuccessful attempts is greater than a predetermined threshold, the trusted core network 302 may shut down the bootstrap bridge. From block 742, the second phase of the method 700 may move to block 744 of FIG. 7D.

At block 744 of FIG. 7D, the second phase of the method 700 may include receiving the solved response to the response challenge from the trusted and authenticated information handling system 304, 404 via the secure gateway at the trusted core network 302. In a particular aspect, the solved response may be transmitted via an out-of-band communication and an embedded controller in order to avoid interrupting the CPU at the trusted and authenticated information handling system 304, 404. At block 746, the second phase of the method 700 may include verifying that the solved response to the response challenge is correct at the trusted core network 302. Once the solved response to the response challenge is verified and is determined to be correct, the second phase of the method 700 may proceed to block 748 where the method 700 may include retrieving a profile for the untrusted (new) information handling system 308 at the trusted core network 302. In particular, the profile may be an eSIM profile may include an integrated circuit card identification number (ICCID) for the untrusted (new) information handling system 308, an international mobile subscriber identity (IMSI) number for the untrusted (new) information handling system 308, security authentication and ciphering information for the untrusted (new) information handling system 308, temporary information related to a local network associated with untrusted (new) the information handling system 308, a list of the services that the untrusted (new) information handling system 308 has access to, and two passwords: a personal identification number (PIN) for ordinary use, and a personal unblocking key (PUK) for PIN unlocking. In particular, the temporary information related to a local network associated with the untrusted (new) information handling system 308 may be used to establish direct network access between the untrusted (new) information handling system 308 and the trusted core network 302, 402. The eSIM profile may be provided to the untrusted (new) information handling system by the trusted core network 302, e.g., by the eSIM bootstrap server 310 at the trusted core network 302. The eSIM profile may be transmitted via an out-of-band communication or a separate link to the trusted core network 302 established by the untrusted (new) information handling system.

Moving to block 750, the second phase of the method 700 may include transmitting the profile for the untrusted (new) information handling system 308 from the trusted core network 302 to the trusted and authenticated information handling system 304, 404. At block 752, the second phase of the method 700 may include receiving the profile for the untrusted (new) information handling system 308 from the trusted core network 302 at the trusted and authenticated information handling system 304, 404. The profile for the untrusted (new) information handling system 308 from the trusted core network 302 may be received at the trusted and authenticated information handling system 304, 404 via the secure gateway 320 within the trusted and authenticated information handling system 304, 404.

Thereafter, at block 754, the second phase of the method 700 may include transmitting the profile for the untrusted (new) information handling system 308 from the trusted and authenticated information handling system 304, 404 to the untrusted (new) information handling system 308. In particular, the profile for the untrusted (new) information handling system 308 may be transmitted from the trusted and authenticated information handling system 304, 404 to the untrusted (new) information handling system 308 via the temporary network enabler 322 within the trusted and authenticated information handling system 308. At block 756, the second phase of the method 700 may include receiving the profile for the untrusted (new) information handling system 308 from the trusted and authenticated information handling system 304, 404 at the untrusted (new) information handling system 308. Further, at block 758, the second phase of the method 700 may include storing the profile for the untrusted (new) information handling system 308 at the untrusted (new) information handling system 308. The profile may be stored within a secure, designated memory for the eSIM. At block 760, the second phase of the method 700 may include triggering a profile update at the untrusted (new) information handling system 308. The profile update may include the permanent credentials that the untrusted (new) information handling system 308 may use to connect to the trusted core network 302 moving forward. At block 762, the second phase of the method 700 may include updating the profile at the untrusted (new) information handling system 308. The method 700 may then proceed to block 764 of FIG. 7E.

At block 764 of FIG. 7E, the method 700 may enter the third phase and the third phase of the method 700 may include transmitting an authentication request from the untrusted (new) information handling system 308 to the trusted core network 302 via a router 306. Moving to block 766, the third phase of the method 700 may include receiving the authentication request at a trusted core network 302, e.g., at the remote provisioning and management module 312. Then, at block 768, the third phase of the method 700 may include performing the authentication of the untrusted (new) information handling system 308 at the trusted core network 302, e.g., within the remote provisioning module. Proceeding to block 770, the third phase of the method 700 may include transmitting the authentication response from the trusted core network 302 to the untrusted (new) information handling system 308 via the router 306. At block 772, the third phase of the method 700, may include receiving the authentication response at the untrusted (new) information handling system 308. Accordingly, the untrusted (new) information handling system 308 may be considered trusted, bootstrapped, and fully provisioned. Thereafter, the method 700 may end. It is to be understood that once the untrusted (new) information handling system 308 is deemed a trusted information handling system, the newly trusted information handling system may use the provisioned eSIM to access a RAN and then, after authenticating the eSIM, the newly trusted information handling system may access various resources on an enterprise network.

The blocks of the flow diagrams of FIG. 5 through FIG. 7E or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Information handling systems, modules, resources, or programs that are in communication with one another need not be in continuous communication with each other, unless expressly specified otherwise. In addition, information handling systems, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a processor;
a memory;
a power management unit (PMU);
a network interface device to establish a bootstrap bridge for providing a transitive bootstrapping process for an untrusted, new information handling system, wherein the bootstrap bridge comprises a temporary network enabler for communicating with the untrusted, new information handling system and a secure gateway for communicating with a trusted core network, and wherein the bootstrap bridge:
receives an authentication request from the untrusted, new information handling system via the temporary network enabler, wherein the authentication request includes an untrusted, new information handling system identification (ID), where the untrusted, new information handling system ID includes temporary authentication data derived from hardware codes and loaded to the untrusted, new information handling system upon manufacture;
transmits a request for challenge for the untrusted, new information handling system ID to the trusted core network via the secure gateway on behalf of the untrusted, new information handling system;
receives a response challenge for the untrusted, new information handling system ID from the trusted core network via the secure gateway and transmits the response challenge to the untrusted, new information handling system via the temporary network enabler; and
receives solved response to the response challenge from the untrusted, new information handling system via the secure gateway and transmits the solved response to the response challenge to the trusted core network via the temporary network enabler.

2. The information handling system of claim 1 wherein the bootstrap bridge within the information handling system the network interface device receiving a signal from the trusted core network via the secure gateway to disable the bootstrap bridge at the information handling system after a predetermined number of attempts to bootstrap the untrusted, new information handling systems via the bootstrap bridge is exceeded.

3. The information handling system of claim 1, wherein the bootstrap bridge within the information handling system the network interface device receiving a signal from the trusted core network via the secure gateway to disable the bootstrap bridge at the information handling system after a predetermined interval between a previous attempt to bootstrap an untrusted, new information handling system and a current attempt to bootstrap an untrusted, new information handling system via the bootstrap bridge is exceeded.

4. The information handling system of claim 1, wherein the bootstrap bridge within the information handling system receives a profile for the untrusted, new information handling system via the secure gateway upon verification that the solved response to the response challenge is correct at the trusted core network and transmits the profile for the untrusted, new information handling system to the untrusted, new information handling system via the temporary gateway.

5. The information handling system of claim 1, wherein the bootstrap bridge operates on a temporary basis.

6. The information handling system of claim 1, wherein the bootstrap bridge is enabled and disabled remotely by the trusted core network.

7. The information handling system of claim 1, wherein the bootstrap bridge is enabled after the information handling system is authenticated with the trusted core network.

8. A method implemented at an information handling system comprising:
transmitting an authentication request for the information handling system to a trusted core network via a secure gateway of a network interface device;
receiving an authentication response at the information handling system via the secure gateway;
enabling a temporary network enabler at the information handling system via a controller; and
enabling a bootstrap bridge at the information handling system via the secure gateway at the network interface device, wherein the bootstrap bridge acts as a go-between between an untrusted, new information handling system and the trusted core network and the exchange of provisioning information between the untrusted, new information handling system and the trusted core network occurs through the information handling system and direct contact between the untrusted, new information handling system and the trusted core network is prevented until the untrusted, new information handling system is provisioned;

receiving an authentication request from the untrusted, new information handling system via the temporary network enabler, wherein the authentication request includes an untrusted, new information handling system identification (ID) includes temporary authentication data derived from and loaded to the untrusted, new information handling system upon manufacture;

transmitting a request for a challenge for the untrusted, new information handling system ID to a trusted core network via the secure gateway;

receiving a response challenge from the trusted core network via the secure gateway;

transmitting the response challenge to the untrusted, new information handling system via the temporary network enabler;

receiving a solved response to the response challenge from the untrusted new information handling system via the temporary network enabler; and transmitting the solved response to the response challenge to the trusted core network via the secure gateway.

9. The method implemented at an information handling system of claim 8 further comprising:

communicating via a near field communication (NFC) radio module with the bootstrap bridge to the untrusted, new information handling system to initiate a transitive bootstrapping process provided by the bootstrap bridge.

10. The method implemented at an information handling system of claim 8 further comprising:

receiving a profile for the untrusted, new information handling system from the trusted core network via the secure gateway; and transmitting the profile for the untrusted, new information handling system to the untrusted, new information handling system via the temporary network enabler.

11. The method implemented at an information handling system of claim 10 further comprising:

receiving a signal from a backend information system via the secure gateway to disable the bootstrap bridge at the information handling system after a predetermined number of attempts to bootstrap untrusted, new information handling systems via the bootstrap bridge is exceeded.

12. The method implemented at an information handling system of claim 10 further comprising:

receiving a signal from a backend information system via the secure gateway to disable the bootstrap bridge at the information handling system after a predetermined interval between a previous attempt to bootstrap an untrusted, new information handling system and a current attempt to bootstrap an untrusted, new information handling system via the bootstrap bridge is exceeded.

13. The method implemented at an information handling system of claim 10 further comprising:

receiving a signal from the backend information system via the secure gateway to disable the bootstrap bridge at the information handling system after a predetermined number of failed authentications of untrusted, new information handling systems via the bootstrap bridge is exceeded.

14. The method implemented at an information handling system of claim 10 further comprising:

receiving a signal from the backend information system via the secure gateway to disable the bootstrap bridge at the information handling system after a predetermined number of successful authentications of untrusted, new information handling systems is exceeded.

15. A bootstrap bridge for an information handling system comprising:

a hardware processor of the information handling system executing code instructions of an operating system (OS);

an embedded controller with a local profile assistant (EC/LPA) operatively coupled to the OS;

a dynamic antenna re-configuration wireless integration radio front-end circuitry system operatively coupled to the EC/LPA and the OS;

a Wi-Fi operatively coupled to the EC/LPA;

a wireless personal area network (WPAN)/Wi-Fi radio operatively coupled to the dynamic antenna re-configuration wireless integration radio front-end circuitry system, wherein the WPAN/Wi-Fi radio acts as a host for an untrusted, new information handling system to create the bootstrap bridge in a secure gateway of a network interface device;

a wireless wide area network (WWAN) radio operatively coupled to the dynamic antenna re-configuration wireless integration module, wherein the WWAN radio acts a host for the untrusted, new information handling system while the untrusted, new information handling system is bootstrapped via a transitive bootstrapping process provided by the information handling system, the WWAN radio comprising embedded subscriber identity (eSIM) capability, embedded universal integrated circuit card (eUICC) capability, or a combination thereof;

the hardware processor execute code instructions upon receiving an authentication request from the untrusted, new information handling system including temporary authentication data derived from and loaded to the untrusted, new information handling system upon manufacture to transmit a request for a challenge and receiving a response challenge from a trusted core network and transmit the response challenge to the untrusted, new information handling system via the temporary network enabler then receive a solved response to the response challenge from the untrusted, new information handling system and transmit the solved response to the response challenge to the trusted core network via a secure gateway;

a plurality of WWAN antennas; and a plurality of wireless local area network (WLAN) antennas, wherein the bootstrap bridge acts as a go-between between the untrusted, new information handling system and the trusted core network, wherein an exchange of provisioning information between the untrusted, new information handling system and the trusted core network occurs through the bootstrap bridge and direct contact between the untrusted, new information handling system and the trusted core network is prevented until the untrusted, new information handling system is provisioned via the bootstrap bridge.

16. The bootstrap bridge of claim 15, wherein the bootstrap bridge is enabled remotely by the trusted core network after the information handling system containing the bootstrap bridge is authenticated by the trusted core network.

17. The bootstrap bridge of claim 15, wherein the bootstrap bridge is disabled remotely by the trusted core network after the untrusted, new information handling system is bootstrapped.

18. The bootstrap bridge of claim 15 further comprising:
a near field communication (NFC) module, wherein the untrusted, (new) new information handling system communicates with the bootstrap bridge via the NFC to initiate a transitive bootstrapping process provided by the bootstrap bridge.

19. The bootstrap bridge of claim 15, wherein the EC/LPA includes a temporary network enabler and the temporary network enabler receives a remote signal to enable one or more of the Wi-Fi module, the WPAN/Wi-Fi radio, and the WWAN radio.

20. The bootstrap bridge of claim 19, wherein the EC/LPA includes one or more transitive bootstrap functions in which the bootstrap bridge receives an authentication request from an untrusted, (new) new information handling system via a temporary network enabler and transmits authentication request to a trusted core network via secure gateway.

* * * * *